US012297693B2

(12) United States Patent
Isaacs

(10) Patent No.: US 12,297,693 B2
(45) Date of Patent: May 13, 2025

(54) ADHESIVE-ATTACHED WINDOW GLAZING ASSEMBLY, MULTI-GLAZED WINDOW ASSEMBLY AND METHOD THEREFOR

(71) Applicant: Mark Isaacs, Bay St. Louis, MS (US)

(72) Inventor: Mark Isaacs, Bay St. Louis, MS (US)

( * ) Notice: Subject to any disclaimer, the term of this patent is extended or adjusted under 35 U.S.C. 154(b) by 142 days.

(21) Appl. No.: 17/849,135

(22) Filed: Jun. 24, 2022

(65) Prior Publication Data

US 2023/0160256 A1 May 25, 2023

Related U.S. Application Data

(63) Continuation-in-part of application No. 16/735,566, filed on Jan. 6, 2020, now abandoned, which is a continuation-in-part of application No. 15/418,953, filed on Jan. 30, 2017, now Pat. No. 10,526,836.

(51) Int. Cl.

| | |
|---|---|
| ***E06B 9/02*** | (2006.01) |
| ***E06B 3/56*** | (2006.01) |
| ***E06B 3/663*** | (2006.01) |
| ***E06B 3/673*** | (2006.01) |

(52) U.S. Cl.

CPC .................. *E06B 9/02* (2013.01); *E06B 3/56* (2013.01); *E06B 3/66323* (2013.01); *E06B 3/66352* (2013.01); *E06B 3/66366* (2013.01); *E06B 3/66376* (2013.01); *E06B 3/6733* (2013.01)

(58) Field of Classification Search

CPC .......... E06B 9/02; E06B 3/56; E06B 3/66323; E06B 3/66352; E06B 3/66376; E06B 3/6733; E06B 3/66366

See application file for complete search history.

(56) References Cited

U.S. PATENT DOCUMENTS

| | | | | |
|---|---|---|---|---|
| 10,526,836 B2 * | 1/2020 | Isaacs | E06B 3/56 | |
| 2002/0046545 A1 * | 4/2002 | France | E06B 3/6675 | 52/786.13 |
| 2005/0132662 A1 * | 6/2005 | Hornung | E06B 3/24 | 52/202 |
| 2014/0326126 A1 * | 11/2014 | Hay, III | E06B 5/10 | 89/36.04 |
| 2020/0141180 A1 * | 5/2020 | Isaacs | E06B 3/5418 | |
| 2023/0160256 A1 * | 5/2023 | Isaacs | F21V 33/006 | 52/202 |

* cited by examiner

*Primary Examiner* — Andrew J Triggs
(74) *Attorney, Agent, or Firm* — Hanrahan Law Firm, P.A.; Benjamin M. Hanrahan

(57) ABSTRACT

A window glazing assembly that can convert an existing or already-installed window, or be used to assemble new construction windows as a multi-pane or multi-glazed window unit, is provided herein. In particular, the glazing assembly includes an attachment assembly (e.g., peel-and-stick double-sided adhesive tape) and one or more glazing layers. Some embodiments further include a spacer assembly comprising a plurality of spacer bars that may be individually installed, e.g., one by one, around the perimeter of the window such as, to the window sash, window frame, or glass window pane, itself. The glazing layer(s) can then be secured or adhered to the spacer assembly, for example, around the perimeter thereof. Some embodiments may include additional or intermediate glazing layers, providing additional insulating airspaces and enhanced performance.

5 Claims, 29 Drawing Sheets

(Example Window Unit)

ADHESIVE-ATTACHED WINDOW GLAZING ASSEMBLY, MULTI-GLAZED WINDOW ASSEMBLY AND METHOD THEREFOR

CLAIM OF PRIORITY/CROSS REFERENCE TO RELATED APPLICATIONS

The present application is a Continuation-In-Part (CIP) Patent Application of previously-filed, currently-pending U.S. patent application Ser. No. 16/735,566 filed on Jan. 6, 2020, which is a Continuation-In-Part (CIP) Patent Application of previously-filed U.S. patent application Ser. No. 15/418,953 filed on Jan. 30, 2017.

The contents of both of the above-referenced, previously-filed patent applications, namely, U.S. patent application Ser. No. 16/735,566 filed on Jan. 6, 2020 and U.S. patent application Ser. No. 15/418,953 filed on Jan. 30, 2017, are incorporated herein in their entirety by reference.

STATEMENT OF GOVERNMENT INTERESTS

One or more inventions described herein was/were made with Government support under a Phase I, Small Business Innovation Research (SBIR) Award No. 2017-33610-26989 awarded by the United States Department of Agriculture (USDA). The Government may have certain rights in the invention.

FIELD OF THE INVENTION

The present invention is generally directed to a window glazing assembly and a method of installing a window glazing assembly to either an already-installed window unit or as a new construction window unit. The glazing assembly is adapted to provide one or more insulated airspaces to the window unit, thereby increasing the thermal insulating capabilities of the window. Retrofits offer an easy-to-install, do-it-yourself (DIY) application. New construction or replacement windows of the present invention offer the capacity for double, triple, quadruple or more thermal performance than existing windows.

BACKGROUND OF THE INVENTION

Many window units, e.g., windows in homes, buildings and/or commercial storefronts, lose or dissipate heat at an astounding rate. For instance, it is estimated that nearly $28 billion in annual energy used is wasted in that it, quite literally, goes out the window. This is true even though many windows, and in particular modern windows include double or multiple panes.

Adding insulating airspaces to the inside of the window unit or outside of the window unit can help maintain heat or keep heat in (when needed, for example in winter or cold climates) and restrict heat or keep heat out (when needed, for example in warmer or summer climates). While there are some assemblies that can be used to create insulating airspaces on windows, such assemblies are often quite complicated to install or are difficult to ensure a quality, airtight fit. In addition, some of the current solutions interfere with window operability, meaning that once installed, the additional components added to the window unit oftentimes interfere with or even prevent the window from being opened in the intended manner.

As a consequence, there is a need in the art for a window glazing assembly that is easy to install in retrofit and new construction applications that can provide a simple way to convert a single or multiple glazed window unit into a further glazed window unit, providing additional window glazing layers and insulating airspaces. It would also be beneficial if the window unit would maintain its original operability, i.e., opening and closing of the window unit is not impeded or substantially impeded by the glazing assembly.

Further advantages of the proposed glazing assembly include a simple DIY installation. High and affordable performance is desirable, for example, providing insulation with an R-value in the range of R-6 to R-14 or better. In this manner, the R-value of a window unit with the proposed glazing assembly installed may be better than some opaque walls.

SUMMARY OF THE INVENTION

The present invention of at least one embodiment is generally directed to a window glazing assembly that can convert an existing or already-installed window to a multi-pane or multi-glazed window unit, providing enhanced insulation capabilities. Other embodiments may include a multi-glazed window assembly for use in new construction or replacement windows.

In particular, the glazing assembly and/or multi-glazed window assembly of at least one embodiment may include an attachment assembly and one or more glazing panels or layers. The attachment assembly may be in the form of a peel-and-stick double sided tape that allows easy attachment of the glazing panel(s) or layer(s) to a selected portion of the window unit, including, but not limited to the window sash or glass window pane, itself. Some embodiments further include a spacer assembly comprising a plurality of spacer bars that may be individually or separately installed, e.g., one by one, around the perimeter of the window (again, to the window sash or glass window pane, itself). The added glazing layer(s) can then be secured or adhered to the spacer assembly, for example, around the perimeter of the glazing layer(s). Some embodiments may include additional or intermediate glazing layers, providing additional insulating airspaces and enhanced performance.

Typical existing single pane wood sashes often have a depth of about 0.5 inches to 1 inch between the sash face and the glass window pane. Applying a clear, double-sided tape or other attachment assembly to the perimeter of the window sash, and then a clear acrylic glazing layer to the tape creates an insulating airspace which can cut single pane thermal loss and gain in half.

Desiccant faced tape or other like drying agents or substances can be exposed to the inside of the created or insulated airspace in order to control condensation, fogging and/or moisture therein. An additional insulating airspace can be created using a spacer assembly (e.g., ⅝×⅝ PVC trim) that can be supplied cut-to-measure for easy peel-and-stick application around the perimeter of the sash, glass or other portion(s) of the window unit. The glazing layer can then be applied to the spacer assembly to create the insulating airspace. It should be noted that the glazing layer(s) can include a sheet of transparent or translucent acrylic, although other embodiments may use other materials, such as glass, etc. As provided herein, the glazing layer(s) can be tinted, e.g., with a window tint film, to provide additional heat resistance or shielding. In further embodiments, the glazing layer(s) may be hurricane wind/impact resistant in order to meet certain building code and other requirements and regulations.

It should also be noted that the present invention may also be applied to new construction or replacement window units.

Furthermore, a thick or wide spacer assembly (e.g., ⅝ inch×1.5 inch PVC trim) may be used or attached to inner or outer glazing layers with one or more intermediate glazing layers within the same spacer assembly or frame. This creates further insulating airspaces (e.g. three) when two glazing layers are spaced 0.5 inches apart. When applied to a window unit, the multi-glazing assembly creates even more enhanced insulating capabilities (e.g., with an R-value of R-5 or better).

In new construction, the inner and outer glazing layers or panels may act as structural diaphragms between the spacer assembly to create a stress-skin panel capable of resisting structural loads. The load-bearing capacity is aided by the additional structural diaphragm created by the intermediate glazing layers through their attachment to the perimeter of the spacer assembly, which effectively acts as both the sash and frame for the window unit. These multi-layered clear-skinned structural diaphragms avoid the use of headers and potentially carry floor or roof loads without added structure. The diaphragms further add to structural lateral resistance as a sheer panel when connected to other structural elements.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 2:
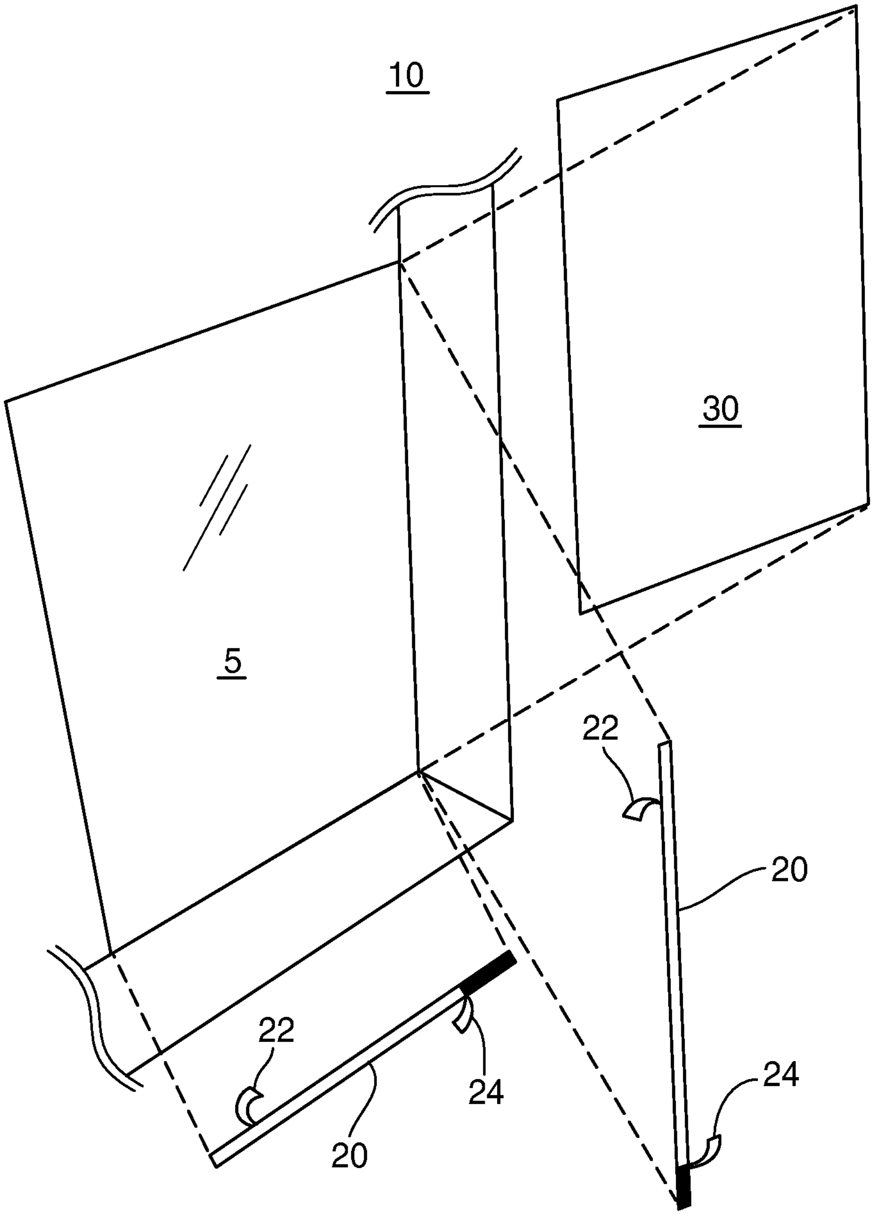
FIG. 2 is a partial cut-away and exploded view of the glazing assembly as disclosed in accordance with at least one embodiment of the present invention.

As shown in the accompanying drawings, at least one embodiment of the present invention is directed to a window glazing assembly, as generally referenced as 10, for example, in FIG. 2. Other embodiments include a multi-glazed window assembly 80 (e.g., as shown in FIGS. 9-12, and a method of installing a window glazing assembly, as generally referenced as 100 in FIG. 15. In particular, the window glazing assembly 10 of at least one embodiment of the present invention comprises a retrofit assembly that can be easily applied or installed to existing or already-installed window units 1. However, it is contemplated that some embodiments of the present invention, and in particular, the multi-glazed window assembly 80 and method 100 can be applied as new construction or as a replacement window.

In any event, the window glazing assembly 10 and multi-glazed window assembly 80 of certain embodiments of the present invention are structured to provide or otherwise create a dead airspace, for example, between the window glazing assembly 10 and the existing window pane(s) 5 of a window unit 1, or between inner and outer glazing layers, to increase or provide enhanced insulation on the window unit 1. For example, certain embodiments of the present invention can be used to reduce thermal loss (e.g. in cold climates) and/or reduce thermal gain (e.g., in warm climates).

Figure 1:
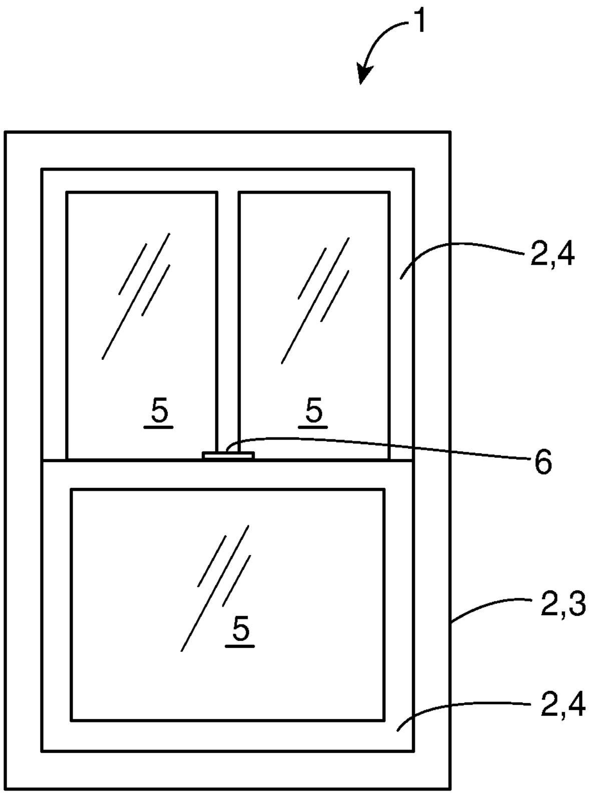
FIG. 1 is an elevation view of the inside of an exemplary window unit.

For instance, with reference to the exemplary window unit 1 represented in FIG. 1, a window unit 1 may include a frame assembly 2 and one or more window panes 5. The window frame 2 may include an outer frame unit, generally represented as 3, and a window sash, generally represented as 4. Particularly, the outer frame unit 3 of the window unit 1 may include the framework that surrounds the entire window unit 1, and may include, for example, the window head unit, jamb, sill, etc. The head unit is generally the main horizontal part of the top of the window frame, the sill is the main horizontal part of the bottom of the window frame, and the jamb are the main vertical parts forming the sides of the window frame 2. The window sash 4 is generally considered the inner portions of the frame 2 that hold or at least partially retain the window pane(s) 5. Specifically, the window sash 4 often holds or retains the glass portion of the window unit 1 and is made up of horizontal and vertical frame units. Oftentimes, depending on the specific construction of the window unit 1, the sash 4 may move, for example, up and down, in and out, side-to-side, etc. in order to open and close the window. With reference to the example shown in FIG. 1, a sash lock 6 locks and unlocks the bottom sash 4, allowing the bottom sash 4 to move up and down, thereby opening and closing the window unit 1. Of course, there any numerous other window units 1 with different constructions, layouts, moving parts, non-moving parts, etc. that can be used in accordance with the various embodiments of the present invention, and it should be understood that the example window unit 1 shown in FIG. 1 is for illustrative or exemplary purposes only.

With reference now to the perspective, exploded and cut-away illustration of FIG. 2, at least a portion of the window glazing assembly 10 of at least one embodiment is shown. Specifically, the window glazing assembly 10 may include an attachment assembly 20 and one or more glazing panels or layers 30. For instance, the attachment assembly 20 is structured and/or adapted to easily attach the glazing layer(s) 30 to the window unit 1, for example, in an overlying or covering relation thereto. In some embodiments, and as shown in FIG. 2, for example, the attachment assembly may include one or more strips or portions of an adhesive tape that can be applied to the window unit 1, and upon which the glazing layer(s) 30 can also be attached or adhered. In this manner, the attachment assembly 20, and in particular, the adhesive tape of at least one embodiment may include a peel-and-stick type of tape with double-sided adhesive surfaces to enable easy application or attachment to the window unit 1 (e.g., to the window sash and/or glass panes) and to the glazing layers 30.

For example, still referring to FIG. 2, the attachment assembly 20, and in particular the attachment tape may include a peel-and-stick double-sided strip of tape such that a layer 22, 24 may be peeled off of one or both sides of the tape to reveal the adhesive surface thereof. One of the adhesive surfaces may be adhered to the window unit 1, for example, at or around the sash 4, whereas the other adhesive surface can be adhered to the inside of the glazing layer 30.

Figure 3:
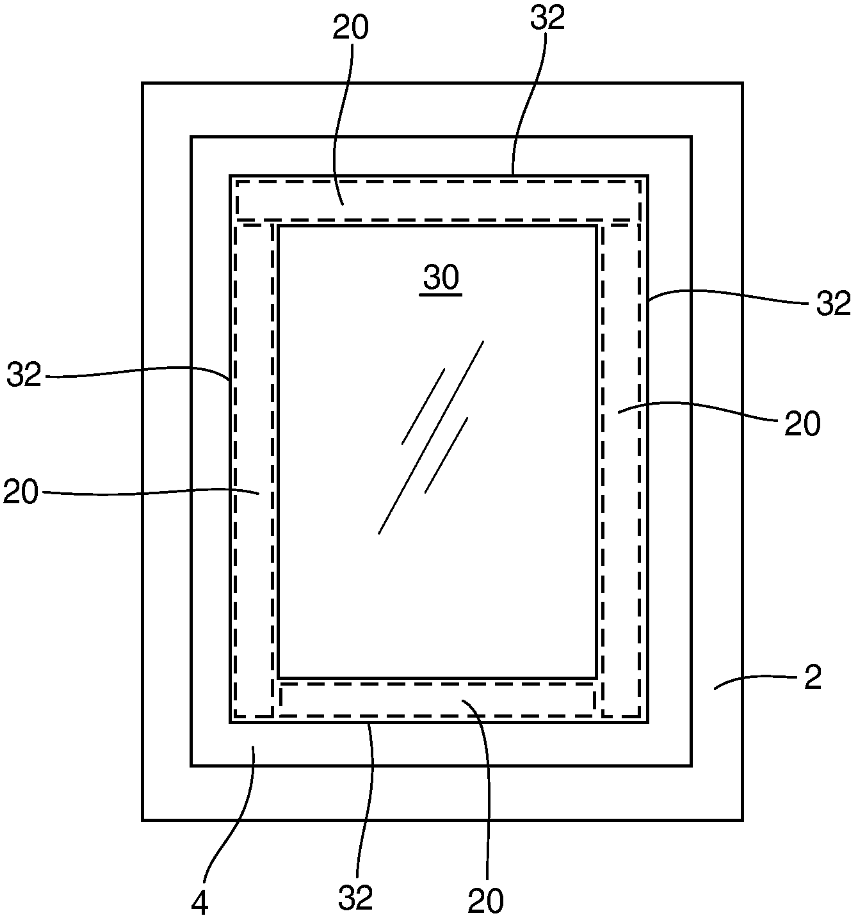
FIG. 3 is an elevation view of a window unit with the glazing assembly of at least one embodiment installed thereon.

Particularly, the attachment assembly, e.g., the peel-and-stick adhesive strips of one embodiment, may be adhered to a portion of the window unit 1, for example, either around the sash 4, another portion of the window frame 2, and/or in some cases, the window pane(s) itself (particularly in commercial, storefront applications). The strips or attachment assembly 20 may be attached to create a substantially continuous perimeter or otherwise be secured to the window unit 1 in a substantially continuous, end-to-end manner, as generally represented in FIG. 3, for example. For instance, in the embodiment where the attachment assembly 20 includes a plurality of strips of adhesive tape, the strips can be secured or adhered one by one in an end-to-end or substantially continuous manner in order to create a substantially continuous seal around the perimeter of the glazing layer 30. This can restrict any unwanted moisture, air, etc. from entering the space between the glazing layer(s) 30 and the existing window pane 5.

Figure 4:
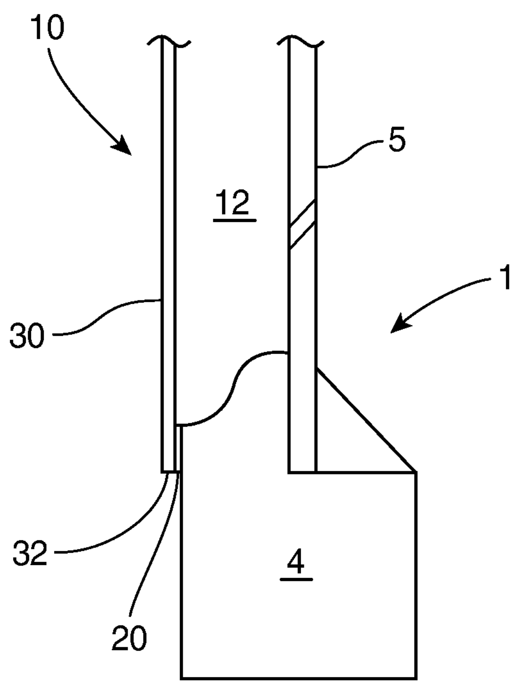
FIG. 4 is a side cut-away view of a window unit with the glazing assembly of at least one embodiment installed on one side thereof.

Furthermore, as shown in FIGS. 3 and 4, for example, the attachment assembly 20, and in particular, the peel-and-stick double-sided adhesive tape of at least one embodiment may be secured at, near or proximate an outer perimeter edge 32 of the glazing layer 30. In this regard, the outer perimeter edge 32 of the glazing layer 30 may be adhered or secured to the window unit 1 via the attachment assembly 20 of at least one embodiment providing a perimeter and edge seal substantially continuously around the glazing layer 30.

With reference now to FIG. 4, a side or cut-away/sectional view is shown with the window glazing assembly 10 installed on one side of a window unit 1. It should be noted that the assembly 10 can be installed on either or both sides, e.g., the inside and/or the outside, of the window unit 1. Particularly, in some applications, the glazing assembly 10 may be installed outside, for example, on an upper portion of a window unit 1, where the lower portion of the window unit 1 slides or moves up in order to open/close the window. This allows the assembly 10 to be installed while maintaining window operability, i.e., maintaining the ability to open/close the window as designed. Other applications (e.g., inside, outside, or both) may differ depending on the style, size and shape of the particular window unit 1.

In any event, still referring to FIG. 4, the assembly 10 creates an airspace, such as an insulated dead airspace 12 between the window pane 5 and the glazing layer 30. The airspace 12 may be approximately ¼ of an inch to ¾ of an inch thick (measured from the window pane 5 to the glazing layer 30), although other sizes and dimensions are contemplated within the full spirit and scope of the present invention. In the embodiment shown in FIG. 4, the attachment assembly is secured to the window sash 4 and the glazing layer 30 is secured or adhered thereto. It should be noted that additional glazing layer(s) 30 may be layered or secured to the inside or outside of the window unit 1 creating additional layered and separated insulated airspaces 12.

Figure 5:
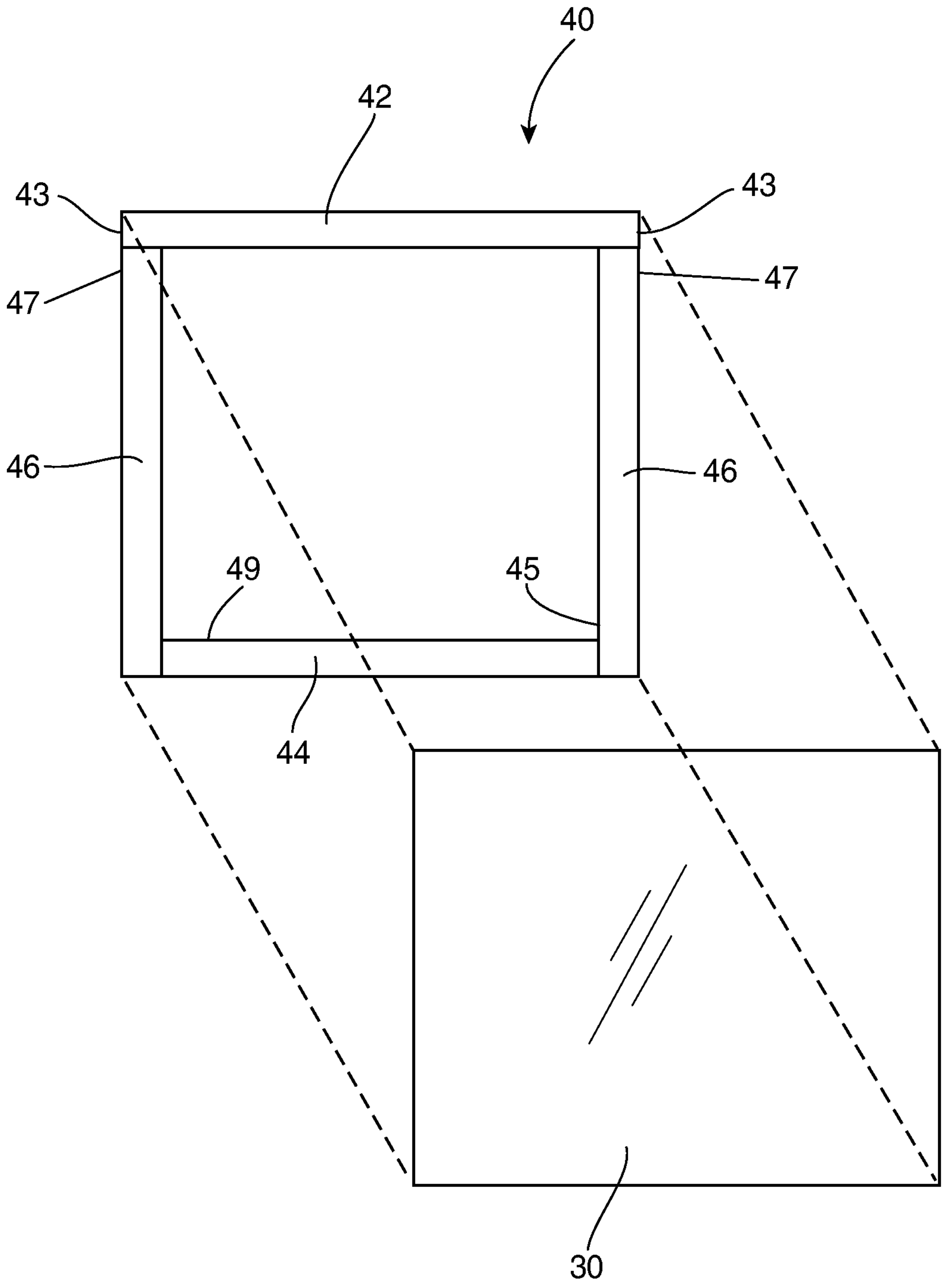
FIG. 5 is an exploded view illustrating the spacer assembly and glazing panel as disclosed in accordance with yet another embodiment of the present invention.

In yet another embodiment, as shown in FIG. 5, the assembly 10 of at least one embodiment includes at least one spacer assembly 40 comprising a plurality of spacer bars 42, 44, 46. The spacer assembly 40 is adapted to secure or adhere to the window unit 1, wherein the glazing layer(s) 30 is secured or adhered to the spacer assembly 40. This spaces the glazing layer(s) 30 from the window unit 1. For example, in some instances, depending on the particular construction or design of the window unit 1, the spacer assembly 40 may be needed in order to space the glazing layer 30 from the window unit 1, for example, maintaining window operability when applied to the sash. In some cases, and particularly but not limited to some commercial storefront applications, the spacer assembly 40 may be adhered or secured to the window pane(s) 5 itself. For instance, some windows may not have a sash 4 or frame 2 that can be easily used or that can be used to attach the glazing layer(s) 30 to. In such a case, the spacer assembly 40 may be used to create a flat surface upon which the glazing layer(s) 30 can be attached, or it can create a spaced relation between the window pane 5 and the glazing layer 30 for the insulated airspace 12.

In some cases, the spacer assembly 40 or spacer bars 42, 44, 46 may be substantially rigid or rigid and, as an example, can be constructed of polyvinyl chloride (PVC) trim material, wood, metal, etc. For example, the various spacer bars 42, 44, 46 of at least one exemplary embodiment may include ⅝ inch×⅝ inch PVC trim material that can be cut-to-measure and easily applied to the window unit 1. Of course, other sizes, dimensions and materials are contemplated within the full spirit and scope of the present invention.

For instance, in at least one embodiment, the spacer assembly 40 may be adhered to the window unit 1 via a peel-and-stick adhesive tape 20. The adhesive tape may be already secured to one side of the spacer assembly 40, or it may be separate such that the user or installer may be able to adhere to the tape or attachment assembly 20 to the spacer assembly 40 and the window unit 1. Accordingly, in such an embodiment, the attachment assembly 20 used to secure the spacer assembly to the window unit may include a peel-and-stick double-sided adhesive tape that can be secured around the perimeter of the spacer assembly 40 between the spacer assembly 40 and the window unit 1 (e.g., on the sash 4 or window pane 5) to provide an air-tight and/or weather-tight seal.

An additional attachment assembly 20, such as additional peel-and-stick double-sided tape may be adhered or secured to the other or outside surface of the spacer assembly 40 in order to allow the glazing layer(s) 30 to be secured or adhered thereto. Accordingly, the spacer assembly 40 may be secured between the window unit 1 and the glazing layer(s) 30 to create the insulated airspace 12, as shown in FIGS. 5 and 6, for example.

Referring to FIG. 5, the spacer assembly 40 of at least one embodiment includes a top spacer bar 42, a bottom spacer bar 44 and two side spacer bars 46. For instance, in one embodiment, the top spacer bar 42 may include opposite lateral ends 43 that extend to or align with outer lateral edges 47 of the side spacer bars 46. In this regard, there are no vertical joints between the top spacer bar 42 and the side spacer bars 46—only the two horizontal joints. This offers structural rigidity in the top spacer bar 42, which can be used as a structural load bearing support in some implementations. Still referring to FIG. 5, the bottom spacer bar 44 of at least one embodiment may fit between inner side edges 45 of the side spacer bars 46 such that there are no vertical joints between the bottom spacer bar 44 and the side spacer bars 46—only the vertical joints.

Figure 6:
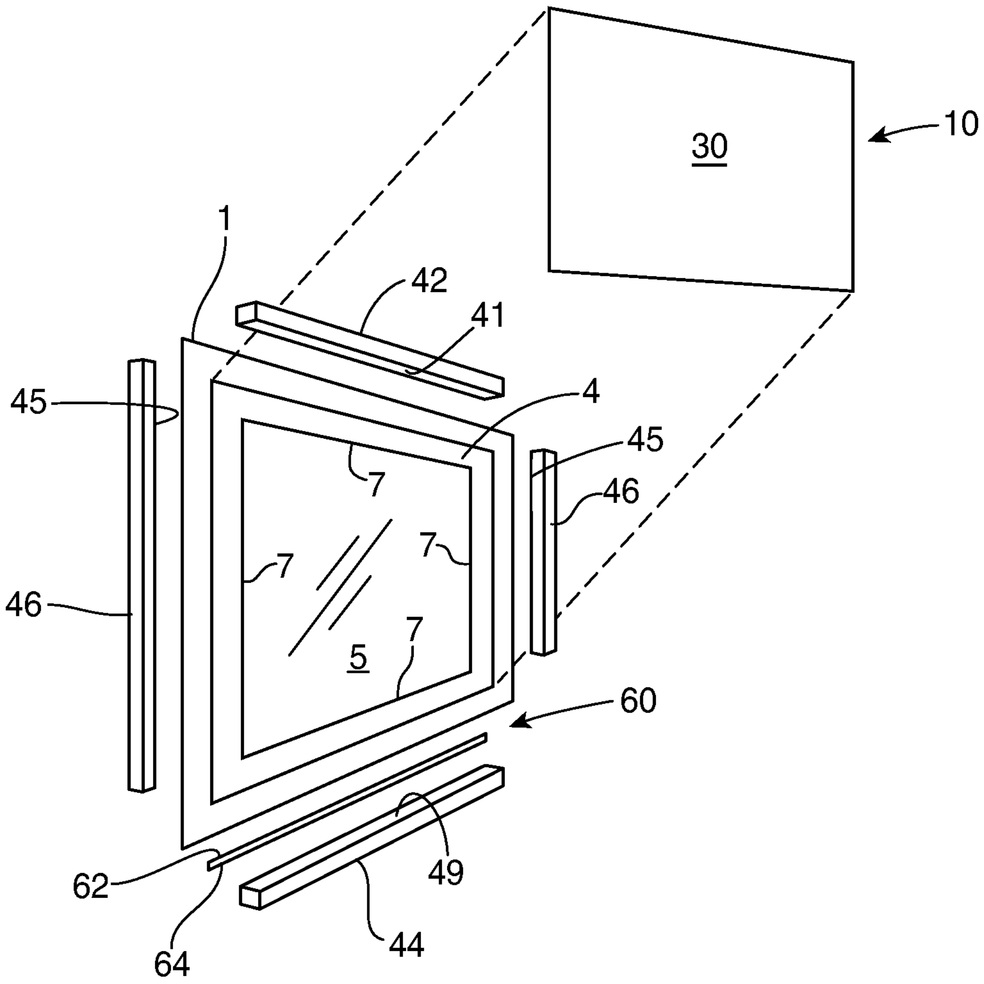
FIG. 6 is a perspective, exploded view of the glazing assembly as disclosed in accordance with at least one embodiment herein.

Furthermore, in at least one embodiment, the inner edge(s) of the spacer assembly 40, represented as 41, 45, and 49 in FIG. 5 may substantially align with or be adjacent the inner edge of the sash 4, represented as 7 in FIG. 6.

Other installation techniques and alignment of the spacer bars or spacer assembly 40 may be implemented in accordance with the various embodiments described herein.

Figure 7:
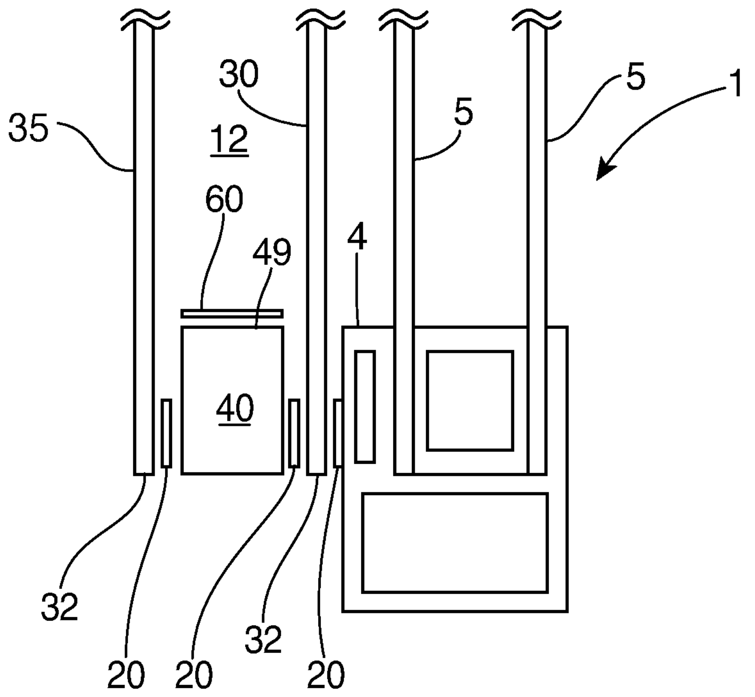
FIG. 7 is a side cut-away view of a window unit with the glazing assembly of one embodiment installed on one side thereof.

With reference now to the cut-away or sectional view of FIG. 7, an exemplary installation of the glazing assembly 10 on one side of a window unit 1 using a spacer assembly 40 is shown. In this example, window unit 1 includes a double pane window, such that the window unit 1 already includes two (2) panes 5. In any event, the spacer assembly 40 is shown as being attached to the inner glazing layer 30 via an attachment assembly 20, such as a peel-and-stick double-sided adhesive tape. Similarly, the outer glazing layer 35 is shown as being attached to the spacer assembly 40 via an additional attachment assembly 20, which again, may be a peel-and-stick double-sided adhesive tape. Other attachment assemblies structured to facilitate the practice of the present invention in the intended manner are contemplated. Either way, the spacer assembly 40 facilitates in the creation of an insulated airspace 12, in this example, between an inner glazing layer 30 and an outer glazing layer 35, with a weather-resistant perimeter seal via the attachment assemblies 20. It should be noted, however, that the attachment assembly 20 may be secured directly to the window unit 1, such as at the sash 4, such that the inner glazing layer 30 shown in FIG. 5 may not be included. In such a case, the spacer assembly 40 facilitates in the creation of an insulated airspace 12 between the window pane 5 and the outer glazing layer 35.

In some embodiments, the spacer assembly 40 and the glazing layer(s) 30 may be constructed of materials with similar coefficients of thermal expansion. For example, in some embodiments the spacer assembly 40 may be constructed of a PVC type of material and the glazing layer(s) 30 may be constructed of an acrylic, plastic or glass. In some implementations, the coefficients of thermal expansion for the material selected for the spacer assembly 40 may be substantially the same as the coefficient of thermal expansion for the material selected for the glazing layer(s) 30, and in particular, the coefficients of thermal expansion may be between 1 and 2 times one another for the different materials or for the spacer assembly 40 and the glazing layer(s) 30.

It should also be noted that the glazing layer(s) 30 of some embodiments may be tinted, for example, it may be coated with a window film comprising a tint that is adapted to restrict the passage of sunlight or UV rays there through. Some embodiments of the glazing layer(s) 30 may also be constructed of a hurricane wind or impact resistant material. In this manner, the assembly 10 of the present invention may also serve to provide thermal loss and gain resistance via the tint or window film and/or impact resistance via the material selected for the glazing layer 30.

Further embodiments may also include a desiccant or other drying agent disposed on the inside of the airspace 12 or otherwise exposed to the inside of the airspace 12 in order to control moisture or condensation with the airspace 12. For example, as shown in FIGS. 6 and 7, in at least one embodiment, a desiccant tape 60 or other drying agent may be adhered to the inside-facing surface(s) 41, 45, 49 of the spacer assembly 40 such that a desiccant or drying agent surface 62 of the tape 60 faces inward toward the airspace 12, and the adhesive surface 64 secures to the spacer assembly 40. Although, the desiccant tape 60 is shown as being attached to the lower or bottom bar 44, the desiccant tape 60 may be adhered or attached to any one or more of the bars 42, 44, 46 of the spacer assembly 60. It should also be noted that the desiccant tape 60 may be adhered to the window unit 1 (such as the sash 2, frame 4, or window pane 5) or to the glazing panel 30, so long as the desiccant surface 62 is exposed to the airspace 12 created by the assembly 10 in order to control moisture, condensation, etc. therein. Other embodiments may use other condensation or moisture control substances or devices, and as such, the present invention is not limited to use of desiccant tape. For example, other types of tape, packets, dry packs, silica gel devices/packs, etc. can be used.

Figure 13:
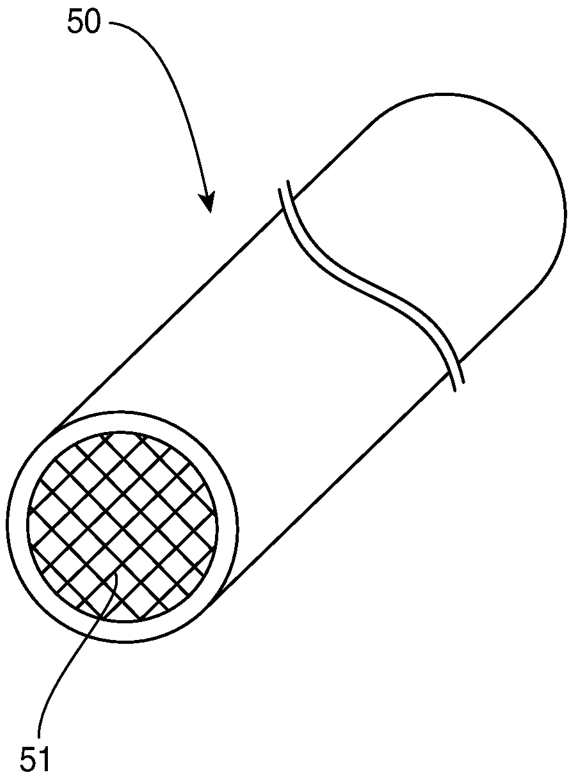
FIG. 13 is a perspective end view of a desiccant-filled conduit as disclosed in accordance with at least one embodiment of the present invention.

Other embodiments may include one or more modular ventilated desiccant (or other drying agent) filled conduits or tubes 50 that may be adhered or attached to the inside face of the sash or spacer bar(s), for example, for condensation control. In particular, with reference to FIGS. 13 and 14, the conduit(s) 50 may include ventilation sections 51, for instance, at the ends or along the length thereof, for allowing the desiccant substance or other drying agent disposed therein to be exposed to surrounding air or environment. In this case, the conduit(s) 50 may be disposed within the insulated airspace(s) 12, for example, by being secured to a portion of the spacer assembly 40, the inside-facing surface of one or more of the layers 30, etc. In yet another embodiment, a desiccant substance (or other drying agent) may be embedded directly in the spacer bar(s) or spacer assembly 40, for instance, in drilled or other made holes or channels. The holes or channels may include a perforated or ventilated cover in order to allow ventilation between the desiccant substance and the insulating airspace 12.

In some cases, the conduit(s) 50 may include or otherwise contain a phase change or heat storage material (PCM), such as, but not limited to a paraffin wax material, in order to moderate the temperature between the inside and outside of the window assembly. For example, a conduit, such as a cross-linked polyethylene pipe, may be disposed between the glazing layers (e.g., around an inside perimeter of one of the glazing layers within the insulated airspace, or in some cases, through the glazing layers. In some cases, the spacer assembly may include a hollow tube filled with or at least partially containing a PCM material.

It should also be noted that the glazing layer(s) 30 and/or spacer assemblies 40 may be constructed in virtually any shape and size, including curves, and thus should not be deemed limited to the square or rectangular shapes shown in the Figures. For example, a curved spacer assembly 40 and/or glazing layer 30 can be used to create airspaces 12 for barrel vaulted skylights, greenhouses, light transmitting panels, and windows with curves and other unique shapes and sizes. For instance, the spacer bar(s) may be bent along the thickness, along with the attachment assembly or adhesive strips and the acrylic (or other) glazing layer(s) to match the curves or other dimensions of virtually any shape and size window, such as skylights, greenhouses, light transmitting panels, etc.

Figure 8:
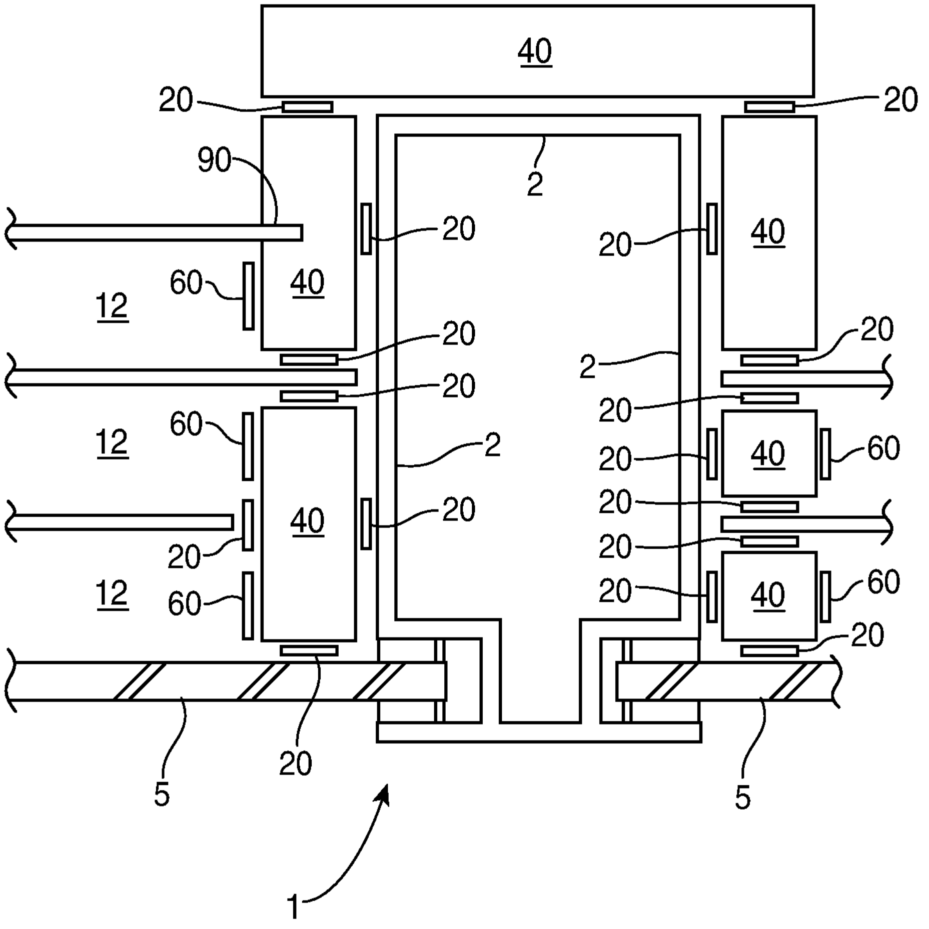
FIG. 8 is a plan view of a storefront window with the glazing assembly of at least one embodiment installed thereon and illustrated in a partially exploded fashion.

Referring now to FIG. 8, a plan and partially exploded view of the glazing assembly 10 is shown installed on an aluminum frame 2 of a commercial storefront, as an example, with a single layer glass pane 5 towards the exterior. Insulating airspaces 12 are created by applying peel-and-stick attachment tape 20 to the frame 2 and/or a plurality of spacer bars or spacer assemblies 40. One or more glazing layers 30 can be applied or secured to the spacer assemblies 40, for example, via attachment tape 20, fitted channels 90, etc. Furthermore, as provided herein, desiccant tape 60 or other like drying agents tubes, conduits or channels may be exposed to the inside of the airspaces 12.

With reference now to FIGS. 9 through 12, the window glazing assembly includes a multi-glazed window assembly, referenced as 80, which may be used for new construction, replacement windows, etc. In particular, the assembly 80 of at least one embodiment includes an inner and outer glazing layers 130, 230, and in some embodiments, one or more intermediate glazing layers 330. Specifically, the inner glazing layer 130 may be facing, exposed to, or disposed on the inside of the building, structure or home, whereas the outer glazing layer 230 may be facing, exposed to, or disposed on the outside of the building structure or home.

Figure 9:
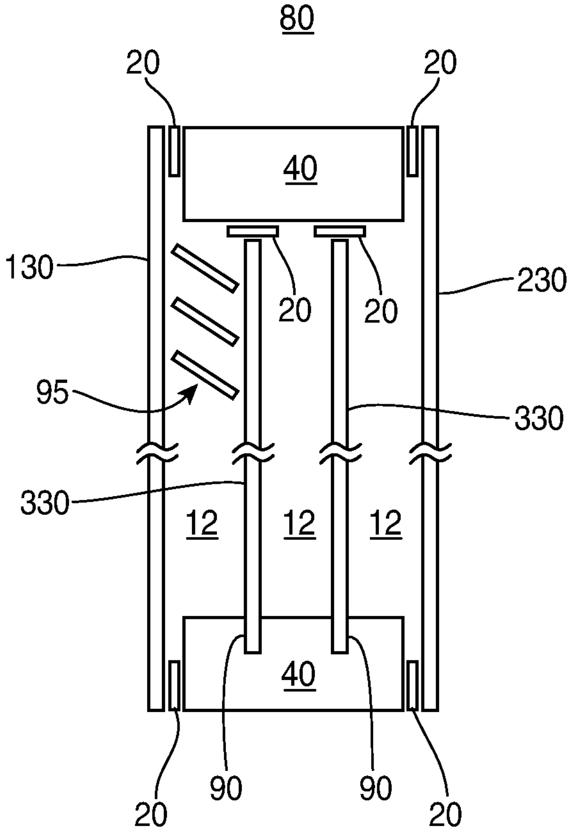
FIG. 9 is a side, sectional and at least partially exploded view of the multi-glazed window assembly as disclosed in accordance with at least one embodiment of the present invention.

Specifically, the embodiment illustrated in FIG. 9 includes an inner glazing layer 130, an outer glazing layer 230 and two intermediate glazing layers 330. The inner and outer glazing layers 130 and 230 are secured to a spacer assembly 40 via an attachment assembly 20, such as, for example, peel-and-stick double-sided adhesive tape, although other attachment assemblies or mechanisms may be used. As before, the tape may be secured around the outer edges of the glazing layers 130, 230 to provide a continuous edge or perimeter seal.

The intermediate glazing layer(s) 330 may be secured to the same spacer assembly 40. For example, in the embodiment illustrated in FIG. 9, the intermediate glazing layers 330 are secured at one end (e.g., the bottom end) to the corresponding (e.g. bottom) bar of the spacer assembly 40 via cooperative slots, channels or kerfs 90 cut into the surface of the spacer bar or spacer assembly 40. At the other end (e.g., top end), the intermediate glazing layers 330 are secured to the spacer assembly 40 via double-sided tape. Other attachment mechanisms, devices, or means are contemplated.

Also, as shown in FIG. 9, a shade assembly, generally referenced as 95 is shown as being disposed between two of the glazing layers and within the insulting airspace 12 created thereby. In the illustration, the shading assembly 95 includes a plurality of spaced louvers that can be used to control an amount of light passing through the window assembly 80. The shade assembly may be fixed or movable and may be secured to the glazing layers and/or to the spacer assembly 40.

Figure 10:
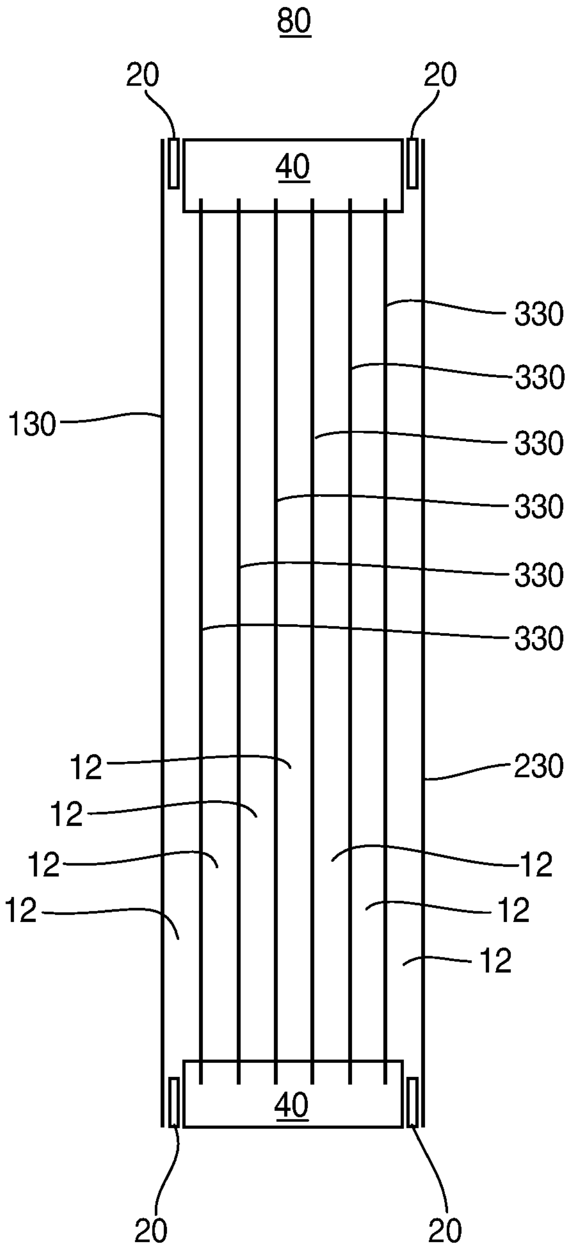
FIG. 10 is a side, sectional and at least partially exploded view of the multi-glazed window assembly as disclosed in accordance with another embodiment of the present invention.

FIG. 10 illustrates a further embodiment of the multi-glazed window assembly 80. In particular, inner and outer glazing layers 130, 230 are adhered to a spacer assembly 40 via an attachment assembly 20, such as double-sided attachment or adhesive tape around its perimeter. A plurality of intermediate glazing layers 330 are secured in slots or channels along the inside of the spacer bars of the spacer assembly 40 to create seven (7) separate insulating airspaces 12. This can create a total thermal resistance or R-value of R-14 or higher. It should also be noted that, the inner and outer glazing layers 130, 230 of this installation may act as structural diaphragms between the spacer assembly 40 to create a stress-skin panel capable of resisting structural loads. The load-bearing capacity is aided by the additional structural diaphragm created by the intermediate glazing layers 330 through their attachment to the spacer assembly 40, which, in some installations, can act as both the sash and frame for the window unit. These multi-layered clear-skinned structural diaphragms may avoid the use of headers and potentially carry floor or roof loads without added structure. The diaphragms further add to structural lateral resistance as a sheer panel when connected to other structural elements.

Figure 11:
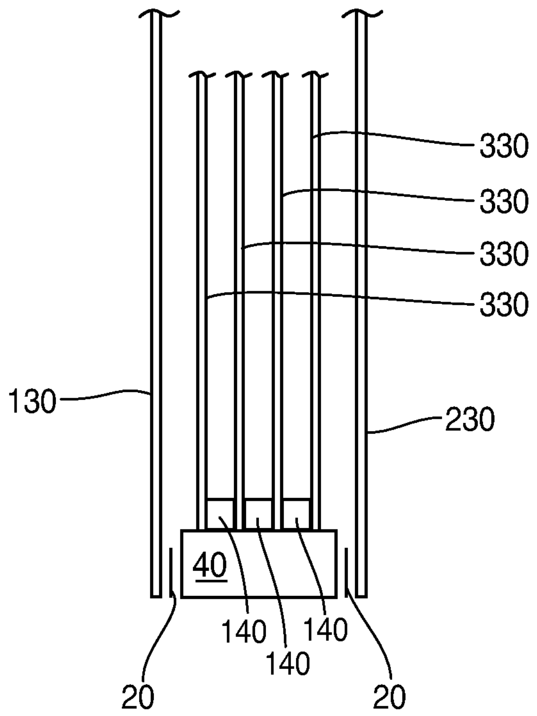
FIG. 11 is a side, sectional, cut-away and at least partially exploded view of the multi-glazed window assembly as disclosed in accordance with another embodiment of the present invention.

FIG. 11 illustrates another embodiment with intermediate spacers 140 secured or disposed between some or all of the intermediate glazing layers 330 in order to facilitate connection or attachment of the intermediate glazing layer 330. For instance, the intermediate spacers 140 may be secured to the inner face of the spacer assembly 40, providing one or more attachment surfaces for the intermediate glazing layers 330 to attach, as shown. The intermediate spacers 140 may be secured or attached to the spacer assembly 40 via an attachment assembly 20, such as double-sided tape or other attachment methods or devices. Similarly, the intermediate glazing layers 330 may be secured to the intermediate spacers 140 via an attachment assembly 20, such as double-sided tape or other methods or devices.

Figure 12:
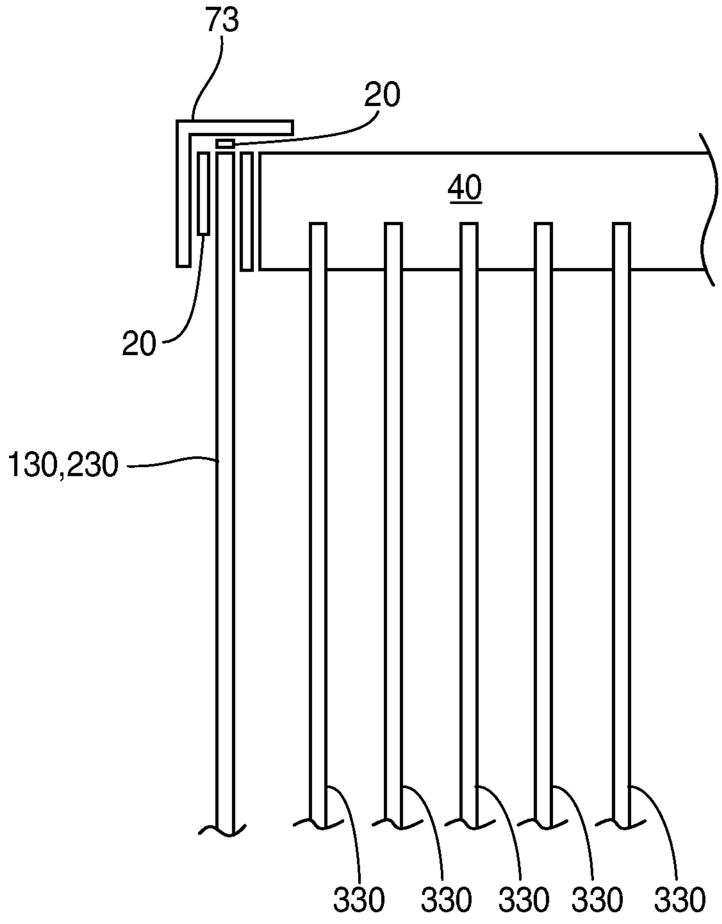
FIG. 12 is a side, sectional, cut-away and at least partially exploded view of the multi-glazed window assembly as disclosed in accordance with yet another embodiment of the present invention.

FIG. 12 illustrates corner edge treatments or covers 73 (e.g., angle section trim) which may be disposed over one or more of the outer exposed corners of the glazing layer(s) 130, 230 in order to create a finished appearance and, in some cases, additional weather protection, particularly for externally installed assemblies 10.

Referring again to FIG. 14, at least one embodiment may further include a conduit 75, such as a ventilation tube or conduit, that passes through one or more of the plurality of glazing layers and provide airflow there through. Particularly, in one embodiment, the conduit 75 or ventilation tube may pass through each of the glazing layers 130, 230, 330 in order to provide ventilation and/or airflow there through, such as, from outside of the building, through the assembly, and into the inside of the building.

Figure 14:
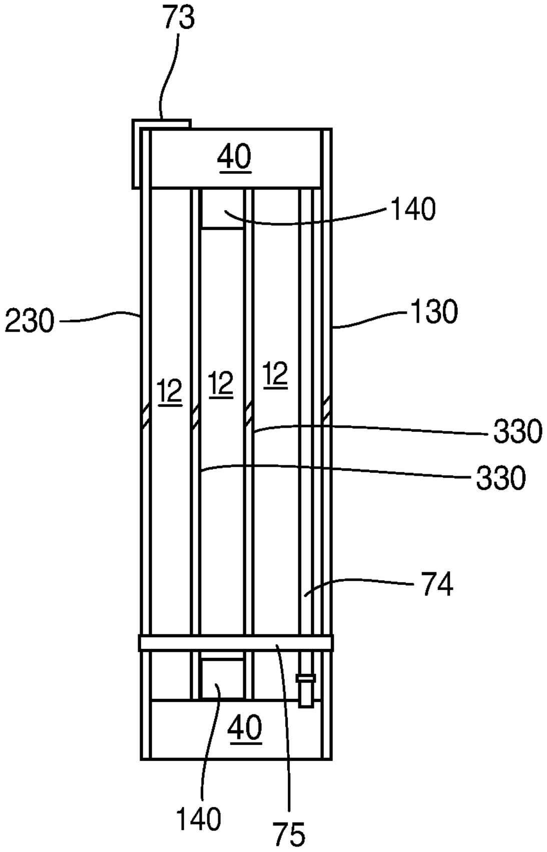
FIG. 14 is a side, sectional and at least partially exploded view of the multi-glazed window assembly as disclosed in accordance with another embodiment of the present invention.

Still referring to FIG. 14, at least one embodiment may further include a heat collection and transfer conduit 74, such as a radiant heat tube, that is disposed within at least one of the airspaces 12. In the embodiment shown, the heat collection and transfer conduit 74 is attached to the spacer assembly 40 at opposite ends thereof, although other attachments or securement of the conduit 74 is contemplated. In any event, the conduit 74 of at least one embodiment may include a heat transfer fluid or other like substance disposed therein for providing radiant heat collection and transfer.

Figure 15:
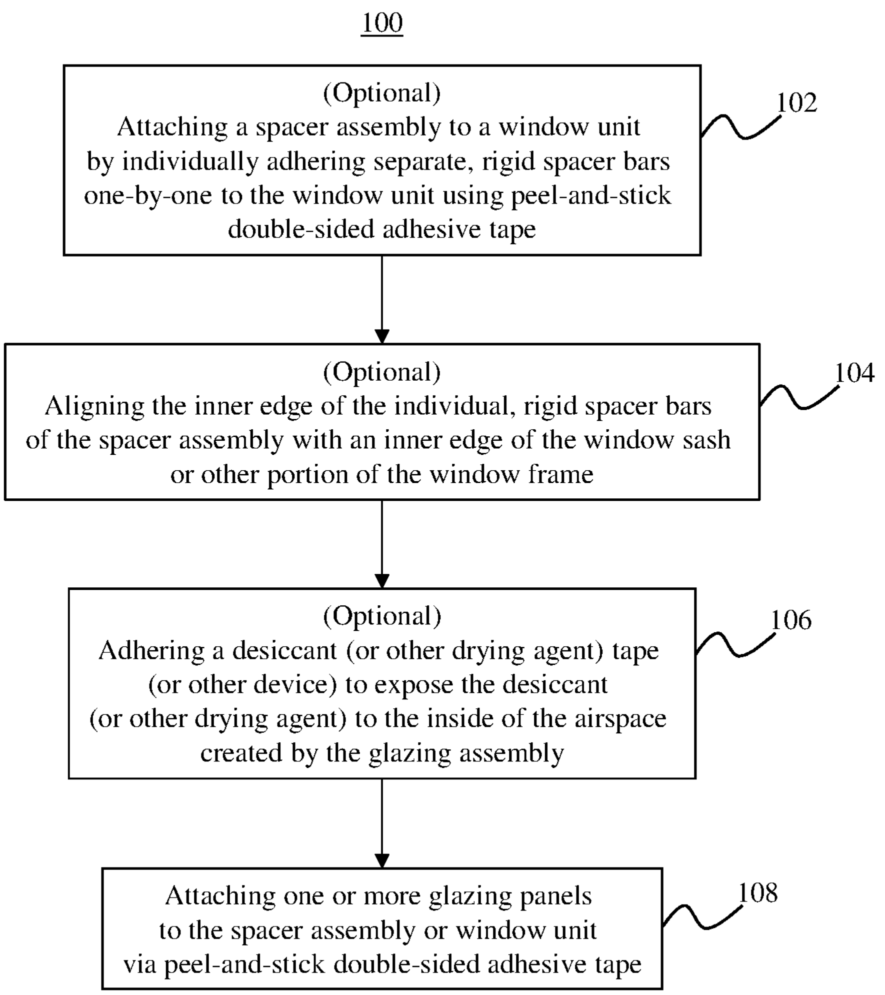
FIG. 15 is a high level flow chart illustrating the method as disclosed in accordance with at least one embodiment of the present invention.

With reference now to FIG. 15, the present invention further comprises a method of installing a glazing assembly 10 to an already-installed window unit or to a new construction window unit. The method, generally referenced as 100, includes attaching a spacer assembly to a window unit 102. As provided above, the spacer assembly 40 of at least one embodiment may include a plurality of separate, rigid spacer bars 42, 44, 46. In one embodiment of the method 100, the individual bars 42, 44, 46 may be adhered to the window unit, one-by-one, to create the final spacer assembly 40. Specifically, rather than assembling a spacer assembly first, and the attaching that assembly to the window unit, the spacer bars 42, 44, 46 may be individually attached to the window unit (e.g., to the sash 4, the window pane 5 or other portions of the frame 2).

As above, in one embodiment, the attachment assembly includes a peel-and-stick double-sided adhesive tape. In this manner, the tape or attachment assembly 20 may be adhered to the spacer assembly 40 or the individual bars thereof, which can then be adhered to the window unit 1. Alternatively, the attachment assembly 20 may first be adhered to the window unit 1, and then the spacer assembly 40, and in particular, the individual bars, may be adhered thereto. Either way, the individual or one-by-one placement or installation of the bars 42, 44, 46 allows the spacer assembly 40 to obtain a tight, secure and weather-resistant seal around its entire perimeter.

Furthermore, as shown at 104, the method 100 may also include aligning the inner edge of the spacer assembly 40, and in particular, the individual bars 42, 44, 46 thereof, to an inner edge of the window frame 2, such as an inner edge of a window sash 2.

Some embodiments also include adhering or installing a desiccant tape or other moisture control device, as shown at 106. For example, the moisture control device or desiccant tape may be adhered to an inside edge of the spacer assembly 40, to the window unit 1, itself, or to any other location, so long as the desiccant portion or other dry material portion is exposed to the inner airspace created by the glazing assembly 10 of the present invention.

Accordingly, as shown at 108, the method 100 further includes attaching the one or more glazing layers 30 to the window unit 1 or to the spacer assembly 40 (if used). The glazing panel 30 may be adhered to the window unit 1 or spacer assembly 40 via peel-and-stick tape or other attachment assembly 20 that will create an airtight and weather-resistant seal, preferably around the perimeter of the glazing layer 30.

Furthermore, it should also be noted that some embodiments of the present invention, as shown in FIG. 10, may include additional or intermediate glazing layers 330, for example, between the window pane 5 and the glazing panel 30 in retrofit situations, or between inner and outer glazing layers 30 in the case of new construction and replacement windows. In this manner, the present invention may create a number of different, individual and spaced airspaces via intermediate spaced glazing layers installed on the inside and/or outside of the window unit 1 or between inner and outer glazing layers 30. This may be accomplished in a number of different ways. For example, in one embodiment, the spacer bars 42, 44, 46 may be thicker (e.g., in the range of 1 inch to 7.25 inches) wide with one or more glazing layers 30 disposed along the width thereof creating a multi-layered glazing assembly with an extremely high thermal resistance and energy efficiency. Particularly, one or more of the intermediate glazing layers can be adhered around its perimeter to the inner face of an intermediate spacer bar 140 (e.g., via glue, tape, etc.) In another embodiment, the spacer bar(s) may include routed slots, channels or kerfs on the inner face thereof for receiving the outer perimeter edge of the intermediate glazing layer(s). In this manner, a plurality of glazing layers may be installed or attached to a spacer assembly creating a plurality of insulated airspaces via a single glazing assembly. In some applications, each ½ inch of insulating airspace, for example, as created by the intermediate glazing layer(s) and/or outer glazing layer(s), forms an R-2 (or more) thermal resistance. For example, an application with three (3) insulating airspaces, created by using three glazing layers, forms an R-6 (or more) thermal resistance.

Moreover, in some embodiments, tinting or other window film or overlay, including a diffusion grid, may be used to control or optimize energy or heat loss/gain depending on various factors, including, but not limited to the particular climate zone in which the window is located in the structure, the compass orientation of the window (e.g., does it face north, south, east or west), the exterior shading condition proximate the window, etc. Particularly, tinted glazing panels may be positioned or located toward the exterior of the window unit in a cooling degree-day-dominated climate, in order to maximize heat rejection. Whereas, tinted glazing layers may be positioned or located toward the interior of the window unit in heating degree-day-dominated climates, thereby balancing desirable winter heat gain with summer heat rejection. This will cause light to be absorbed and the reradiated as heat from the tinted glazing panels work in favor of the dominate season.

Additionally, in some embodiments, one or more of the glazing layers, such as the inner or outer glazing layers 130, 230, for example, may be at least partially covered with a film or sheet (e.g., a static film covering) that provides sacrificial and easily replaceable UV and scratch resistance.

With reference now to FIGS. 16A, 16B, 16C and 16D yet another embodiment of the multi-glazed window assembly of the present invention is illustrated. In particular, the window assembly may include a perimeter sash assembly 340, or otherwise a perimeter or first spacer assembly constructed of or comprising a bottom perimeter sash 342, a top perimeter sash 344, and side perimeters sashes, such as left side perimeter sash 346 and right side perimeter sash 348. It should be noted that the perimeter sash assembly 340 of at least one embodiment functions as the window sash, as well as at least a portion of the spacer assembly described herein and used to space a plurality of glazing layers. The perimeter sash assembly 340 may be constructed of wood, PVC, plastic, composite materials, metal, etc.

As will become apparent herein, and with reference to the Figures, each of the perimeter sashes 342, 344, 346, 348 of the perimeter sash assembly 340 includes an enclosed or inner surface 340C spanning between a corresponding first (or interior) face 340A and a second (or exterior) face 340B. The enclosed surface 340C of at least one embodiment may be used to define the width of the perimeter sash assembly 340, which can be measured between a first face 340A and a corresponding second face 340B of a common one of the plurality of perimeter sashes 342, 344, 346, 348.

Furthermore, an inner spacer assembly 440 may also be included, and is similar to the intermediate spacers 140 disclosed above in accordance with at least one embodiment, and thus may be rigid and/or constructed of wood, PVC, plastic, composite materials, metal, etc. In particular, inner spacer assembly 440 may include at least one bottom spacer 442, at least one top spacer 444, and at least two side spacers, such as a left side spacer 446 and right side spacer 448.

Each of the spacers 442, 444, 446, 448 of the spacer assembly 440 includes an enclosed first face 440A and a second face 440B, opposite one another, as shown in the Figures. The width of the spacer assembly 440 may be measured between a first face 440A and a corresponding second face 440B of a common one of the plurality of spacers 442, 444, 446, 448. With reference to the cut away views of FIGS. 16B, 16C and 16D, the spacer assembly 440 is, in at least one embodiment, separate from the perimeter sash assembly 340 and is attached or fixed to the enclosed surface 340C of the perimeter sash assembly 340 and the spacer assembly 440 includes a width that is less than the width of the perimeter sash assembly.

Moreover, an inner glazing layer 130 is attached to the first surface(s) 340A of the perimeter sash assembly 340 via an attachment assembly 20. At least one first intermediate glazing layer 330A is attached to the first surfaces 440A of the spacer assembly 440, and at least one second intermediate glazing layer 330B is attached to the second surfaces 440B of the spacer assembly 440. It should be noted that additional spacer assemblies 440 and additional intermediate glazing layers 330 can be included in accordance with the various embodiments of the present invention, as provided above with reference to FIG. 11, for example. Finally, an outer glazing layer 230 is attached to the second or outer surfaces 340B of the perimeter sash assembly 340.

It should be noted that the various glazing layers 130, 230, 330 of the present invention is attached to the corresponding surfaces of the sash assembly 340 and/or spacer assembly 440 via an attachment assembly 20, which, as described above in accordance with other embodiments, may include, but is not limited to, a double-sided adhesive tape.

Furthermore, in at least one embodiment, the window assembly may include one or more layers of sealing tape, generally referenced as 350, adhered or secured to a perimeter of the inner glazing layer 130, a perimeter of the outer glazing layer 230, and an exposed portion of the perimeter sash assembly 340 that spans between the inner glazing layer 130 and outer glazing layer 230, for example, over a top exposed surface of the top perimeter sash 344, a bottom exposed surface of the bottom perimeter sash 342, and side exposed surfaces of the side sashes 346, 348. In this manner, the sealing tape 350 secures the joints between glazing layers 130, 230 and the corresponding or adjacent portions of the perimeter sash assembly 340. This can allow for easy repair of the glazing layers 130, 230 and can provide waterproof protection to the window assembly. Particularly, in the event one of the glazing layers 130, 230 becomes damaged or broken, the sealing tape 350 can be removed or partially removed to easily replace the broken or damaged glazing layer 130, 230.

Figure 16A:
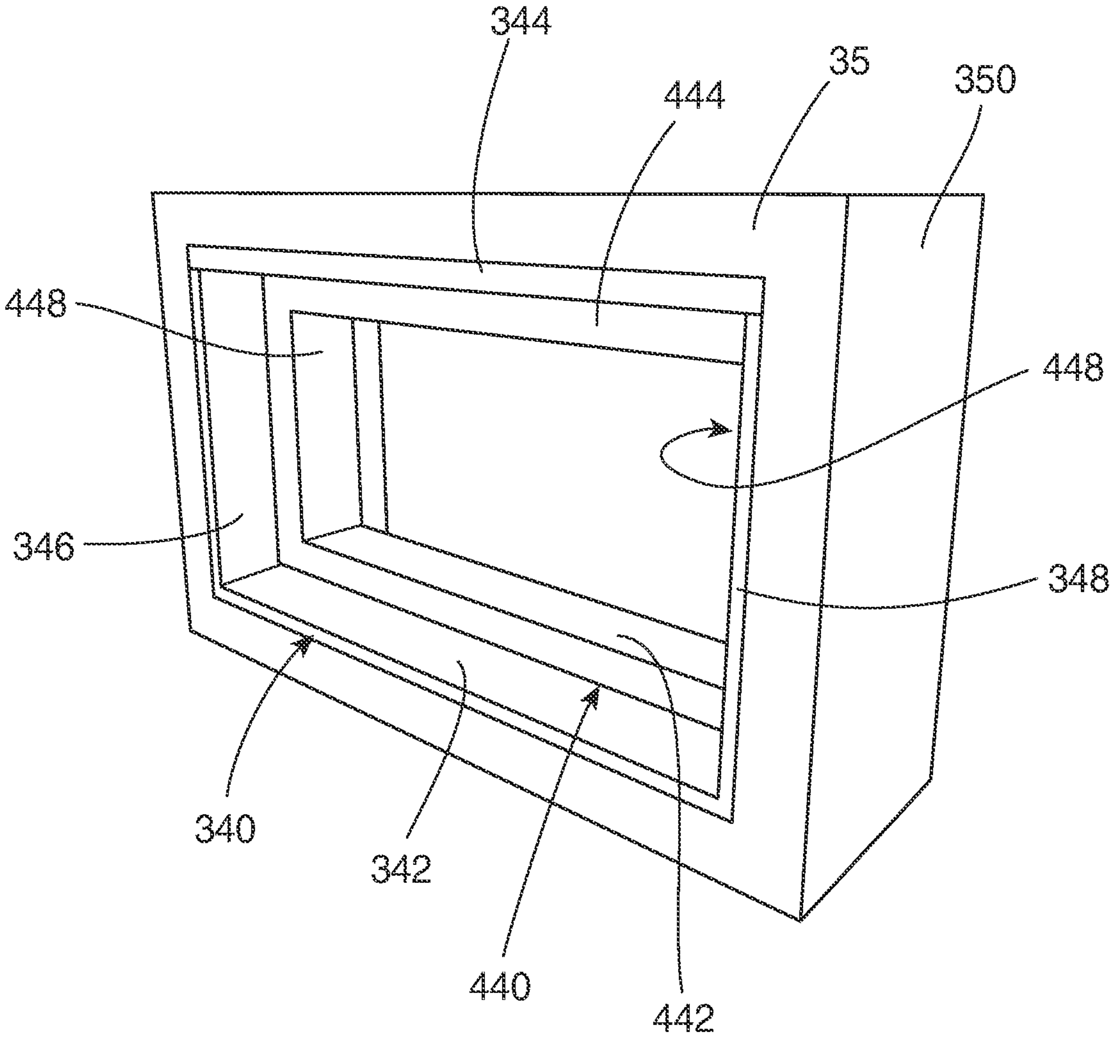
FIG. 16A is a perspective view of the window assembly as disclosed in accordance with at least one embodiment of the present invention.
Figure 16B:
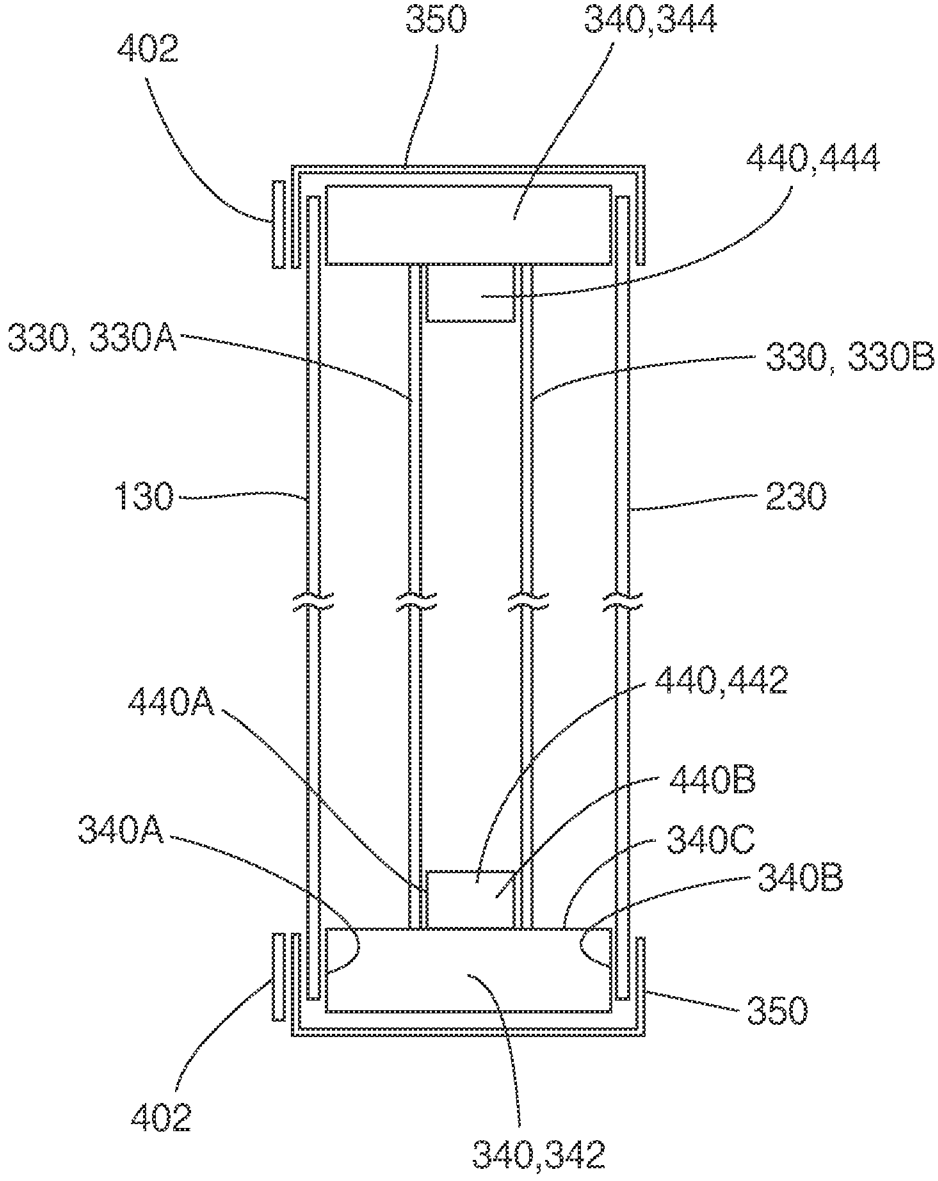
FIG. 16B is a cut-away partially exploded view of the window assembly illustrated in FIG. 16A.
Figure 16C:
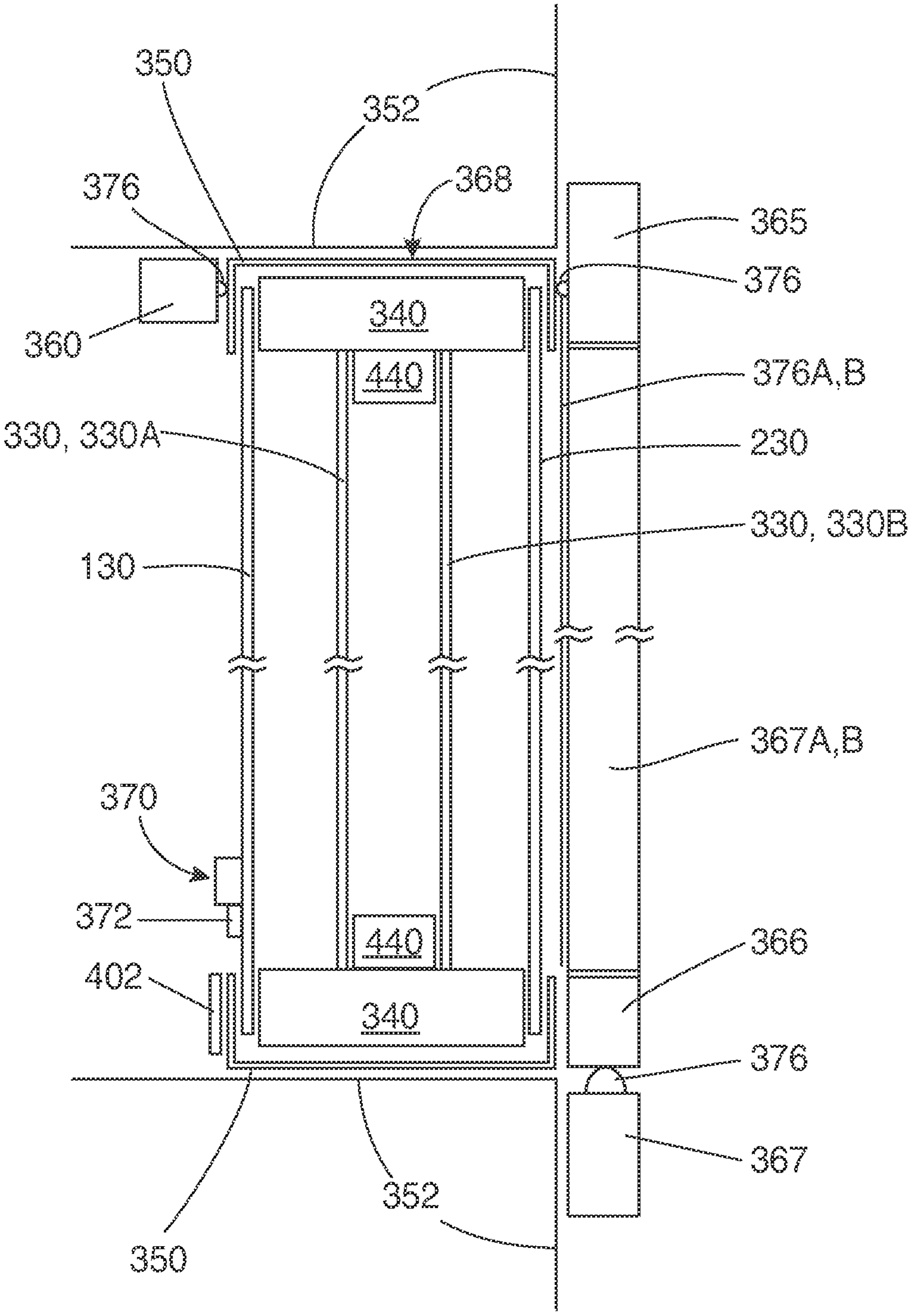
FIG. 16C is a cut-away, partially exploded view of the window assembly illustrated in FIG. 16A and installed within a window opening as a lift-out egress window unit.

With particular reference to FIG. 16C, the window assembly 10 of at least one embodiment can be installed within a window opening 352 of a building in a manner to allow the window assembly 10 to be easily removed, for example, in the event an occupant is in need of an emergency exit or egress from the building.

More specifically, at least two stops or framing sections, such as a first (or interior) stop 360 and a second (or exterior) stop 365 are fixed to the building at or near the window opening 352 in a manner to create or define a channel or space 368 therebetween within which a portion of the window assembly 10 is disposed. The stops 360, 365 may be constructed of wood, metal, PVC, etc. and may, but need not necessarily, span the entire width of the window opening or a substantial portion of the window opening. For example, in at least one embodiment, stop or framing section 365 is a horizontally elongated structure that may extend from or near one side of the window opening to or near the other side. Similarly, stop or framing section 360 is a horizontally elongated structure that may extend from or near one side of the window opening to or near the other side. FIG. 16C is a sectional and exploded view showing a cross section of two stops 360, 365.

In the example illustrated in FIG. 16C, the first stop 360 is secured or fixed to an upper surface of the window opening 352, while the second stop 365 is spaced from the first stop 365 a sufficient distance such that the top portion of the window assembly 10, such as the top perimeter sash 344, is able to slide therein and be disposed between the first and second stops 360, 365. In the illustrated embodiment, the second stop 365 is secured to an outside surface of the building and at least partially overhangs the window opening 352 such that a portion of the second stop 365 is aligned with the first stop 360 to define the channel or opening therebetween. Other positions of the first and second stops 360, 365 are contemplated within the full spirit and scope of the present invention.

Moreover, a bottom exterior stop or framing section 367 may also be provided and fixed to the exterior of the building, as shown in FIG. 16C. In some cases, an additional support structure or sill trim frame 366 may be secured to the outside of the window assembly 10, e.g., secured to the tape 350 or other like portion, in order to allow for attachment with the bottom exterior framing section 367. It should be noted again that FIG. 16C shows a partially exploded view such that adjacent pieces, for example, trim frame 366 is attached to the adjacent tape 350, which is attached to the glazing layers 130, 230, which is attached to the sash assembly 340.

Still referring to FIG. 16C, vertical side frames 367A, 367B extend or are disposed vertically along the left and right sides of the window opening 352. In this manner, stops or framing sections 365, 366, 367, 367A, and 367B frame the window opening vertically on the left and right sides (via 367A, B) and horizontally on the top and bottom (via stops or frames 365, 366, 367). In some embodiments, vertical framing members 367A and 367B, may extend into or over the window opening such that the framing members 367A and 367B may act as side stops thereby engaging a portion of the perimeter of the window assembly. Accordingly, reference numerals 376A and 376B represent compression gaskets or compression weather stripping disposed between the corresponding vertical stops 367A, 367B and an outer or perimeter vertical edge of the window assembly.

In other words, vertical stop 367A may be secured to the building on one side of the window opening, partially extending over and into the window opening, and secured or attached against the window assembly with compression weather stripping 376A disposed therebetween. Similarly, vertical stop 367B may be secured to the building on the other side of the window opening, particularly extending over and into the window opening, and secured or attached against the window assembly with compression weather stripping 376B. FIG. 16E illustrates an external view of the stops 365, 367A, 367B and 366 overlapping the window opening 352, as described herein. Similar to other figures herein, FIG. 16E is partially exploded in that stop 367A of at least one embodiment may abut or connect to stop 365 and 366, and stop 367 may abut or connect to stop 365 and 366. Similarly, as shown in FIG. 16C, stop 366 may abut or connect to 377 with a compression weather stripping 376 there between.

Furthermore, a locking assembly 370 may also be included and disposable between a locked orientation (thereby locking the window assembly 10 in place) and an unlocked orientation (thereby allowing the window assembly 10 to be installed or easily removed, for example, in the event of an emergency exit or egress.) More specifically, the locking assembly 370 is disposed between the window assembly and the window opening 352 or between the window assembly 10 and a fixed portion of the building such as a framing fixture, wall, base, etc.

As just an example, the one or more locking assemblies 370 of at least one embodiment may include a sliding rail lock or pin 372 that is disposable into a corresponding and aligned locking hole located in a fixed position, for example, on the building or framing fixture(s) of the window opening. Sliding the lock or pin within the corresponding locking hole will cause the window assembly 10 to be secured in place, as shown in FIG. 16C, for example. Removing the lock or pin from the corresponding locking hole will disengage or unlock the locking assembly 370, allowing the window unit 10 to be pushed out of the window opening (e.g., to the right in FIG. 16C) or pulled into the building through the window opening (e.g., to the left in FIG. 16C). Other locking assemblies structured to facilitate practice of the present invention in the intended manner are contemplated herein.

In some embodiments, one or more handles or finger-pull hardware may be installed on the inside of the window assembly to assist the user in pulling the window assembly away from and completely out of the window opening. This will, thus, create an opening through which an occupant can easily escape or egress, for example, in the event of a fire or other emergency situation.

In certain embodiments, the window assembly 10 may fit between twenty four inches on center framing or within an opening that leaves twenty two inches minimum of a clear opening for egress, or otherwise an opening that meets emergency egress requirements of building codes. This window assembly 10 can also be installed within the window opening without the use of structural headers, jack and cripple studs that are associated with the installation of conventional windows.

It should also be noted that, as shown by reference character 376 in FIG. 16C, for example, compression weather stripping can be disposed between various the one or more stops 360, 365, 367 and corresponding portions of the window assembly 10, for example, a portion of the glazing layers 130, 230 thereof, in order to facilitate or create a tight and in some cases waterproof seal therebetween. The locking assembly 370, when locked, can serve to secure the window assembly 10 against the one or more compression weather stripping or gaskets 376.

Figure 16D:
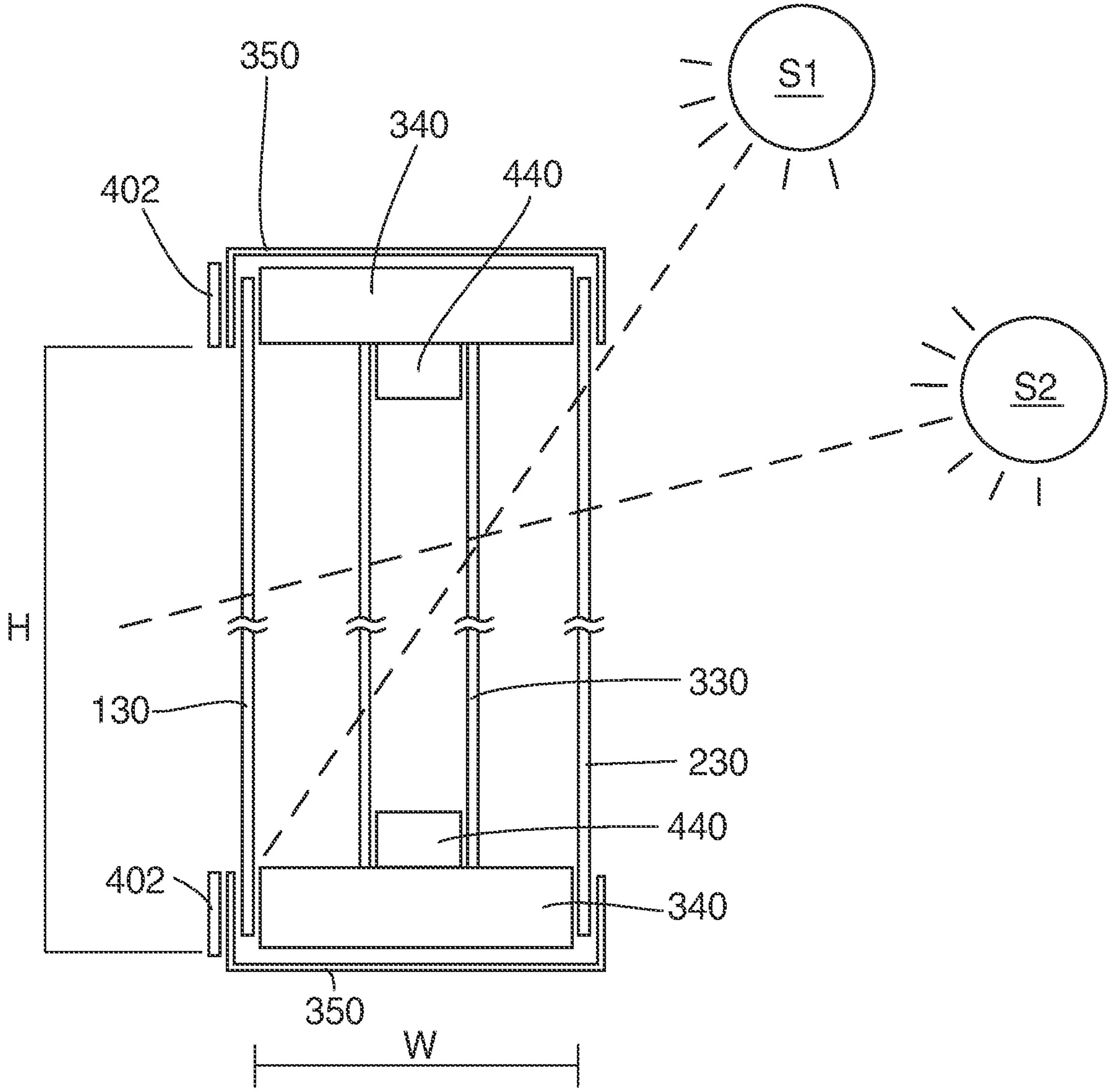
FIG. 16D is a cut-away, partially exploded view of the window assembly illustrated in FIG. 16A showing exemplary summer and winter sun rays.
Figure 16E:
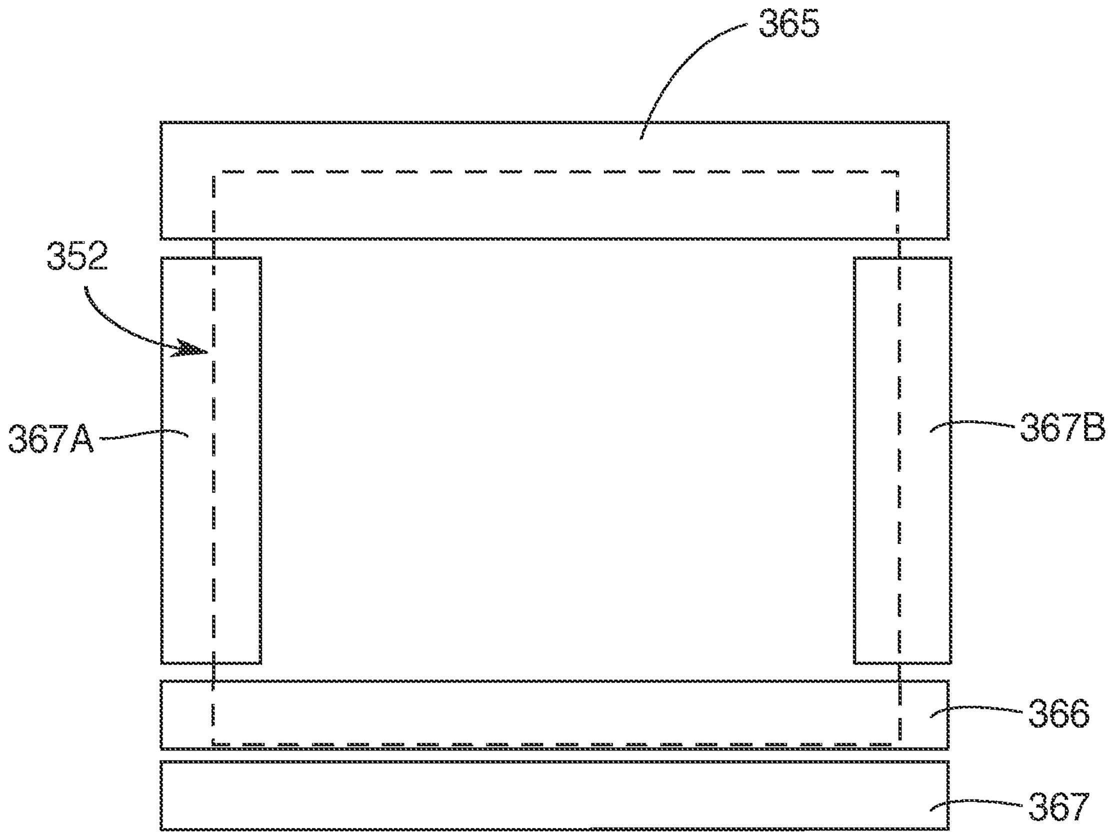
FIG. 16E is an exterior to interior view of the window opening showing the second stop and external framing structures as disclosed in accordance with at least one embodiment of the present invention.

Referring now to FIG. 16D, the window assembly 10 of at least one embodiment may be constructed with a window height H and window sash width W or depth that strategically provides passive seasonal shading. For example, the summer sun (generally referenced as S1 in FIG. 16D) is higher in the sky (on south facing elevations, for example) than the winter sun (generally referenced as S2). The window assembly 10 can be constructed or dimensioned such that the summer sun rays are shaded or substantially shaded by the sash assembly 340 (as schematically illustrated) such that the summer sun rays do not enter the building interior or are at least partially, and in some cases, substantially blocked, by the sash assembly 340. In particular, the window assembly 10 may be dimensions such that the summer sun rays may be at least partially blocked by the outer edge of the top sash, such that the rays will fall within the width or depth W of the sash assembly 340 and are thus substantially or at least partially blocked from entering the building interior. This, of course, avoids or reduces solar heat gain on the interior of the building. In this manner, the window height H may be approximately twice or double the size of the sash width/depth W. As just an example, the window height or sash height H may be about five and a half inches, whereas the sash width/depth W may be about two and a half inches—approximately a 2:1 ratio. Of course, other dimensions and ratios are contemplated.

Conversely, since the winter sun (S2) is lower in the sky than the summer sun (S1), the winter sun rays may pass through the window assembly 10 to provide solar heat gain to the interior of the building.

Figure 17:
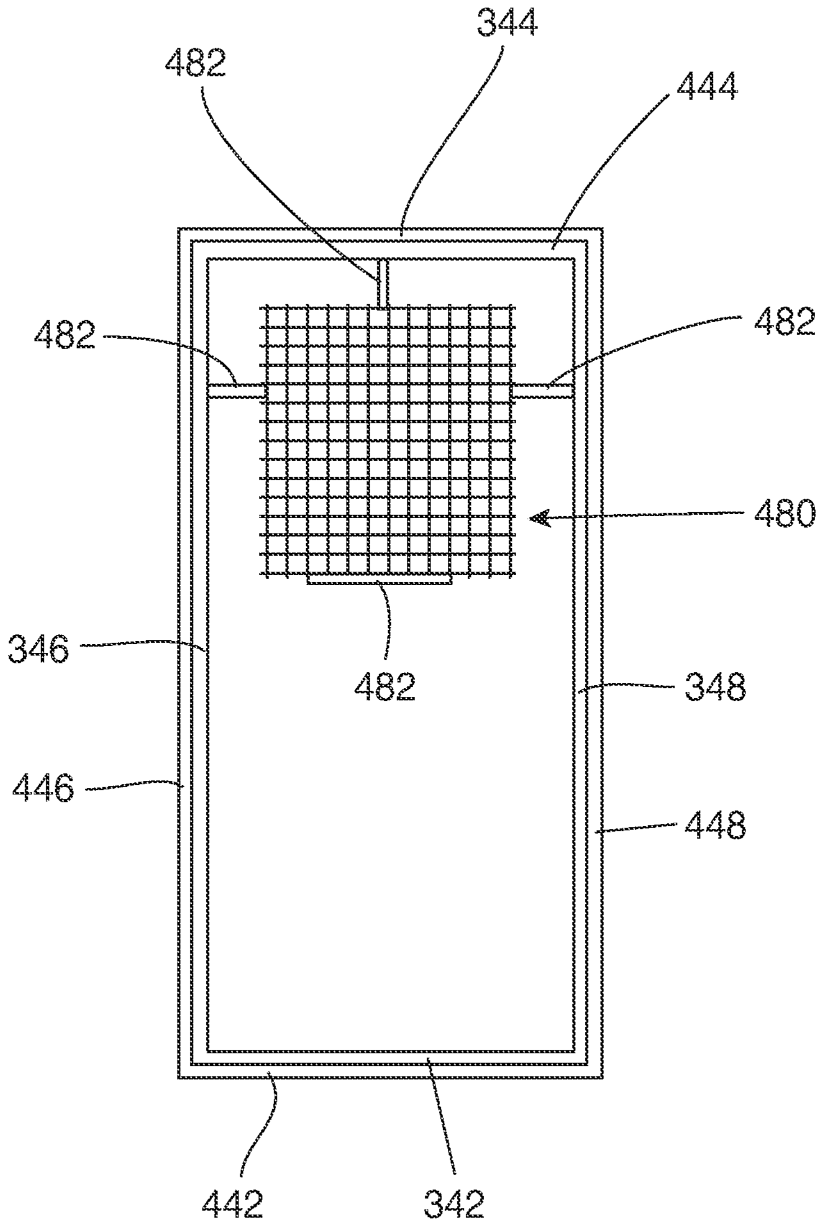
FIG. 17 is a plan view of yet another embodiment of the window assembly of the present invention with at least one diffusion grid installed therein.

With reference now to FIG. 17, a front view of a window assembly of at least one embodiment is shown with the use of a diffusion grid 480 disposed on a portion thereof. Fixed louvers or supports 482 may be dispose within one or more of the insulating air spaces disposed or defined between adjacent glazing layers 130, 230, 330. The fixed louvers or supports 482 may be adhered or fixed or one or more surfaces of the adjacent glazing layers and can be used to hold or support the diffusion grid 480. The diffusion grid can be used to provide summer shading, winter gain, and year round daylight bounced deeper into the interior space of the building by diffusing the sun light disposed there through. In some cases, the diffusion grid can be used as providing glare control, as well. In other embodiments, tinting or other light deflection or reduction structures can be used on the surface of one or more of the glazing layers or between adjacent glazing layers. It should be noted that the window assembly shown in FIG. 17 can be a retrofit assembly attachable to an existing window unit, for example, via one or more spacer assemblies, as disclosed herein. In other embodiments, the window assembly may be un the form of a stand-alone window unit for new construction or replacement windows.

Figure 18:
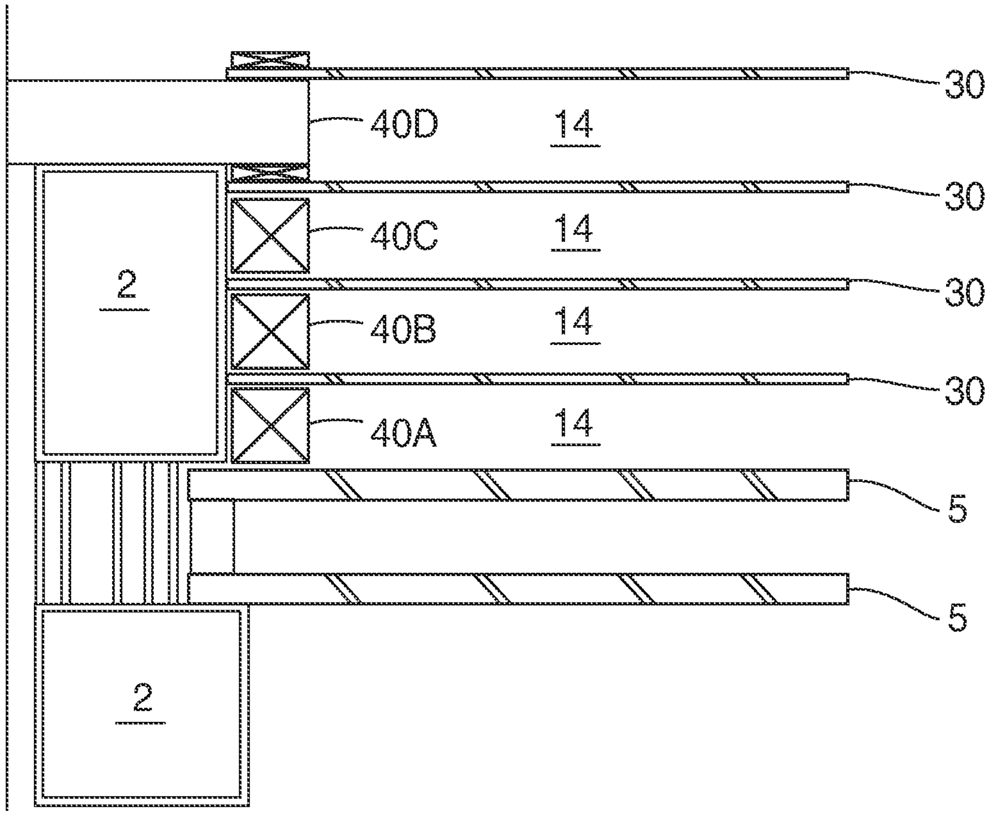
FIG. 18 is a partial cut-away view of a retrofit application of the window assembly as disclosed in accordance with at least one embodiment of the present invention.

FIG. 18 is an exemplary top-down sectional view of a retrofit window assembly, similar to that shown in FIG. 8 and described above. In particular, an existing window unit may include one or more windows 5 secured to (typically metal or aluminum) frame 2. This is a common storefront window construction, although not necessarily limited to such. In particular, a first spacer 40A is secured to one of the exposed existing window units 5 with a glazing layer 30 secured to the opposite side of the spacer 40A to create an insulating airspace 14 therebetween. The installation may continue with successive, one-by-one installation of spacers 40A, 40B, 40C, 40D and glazing layers 30 until the desired amount of insulating airspaces 14 or glazing layers 30 is achieved. It should also be noted that spacers 40A, 40B, 40C and 40D can insulate the existing metal sash 2.

More in particular, the installation process begins with the attachment of the first spacer 40A to the window unit 5. Then, the first glazing layer 30 is attached to the first spacer 40A, as shown in the example of FIG. 18. Next, a second spacer 40B is attached to the exposed surface of the first glazing layer 30, and a second glazing layer 30 is attached to the second spacer 40B. This process continues with alternating installation of spacers 40 and glazing layers. As described above in connection with at least one embodiment, the spacers and glazing layers may be attached via one or more strips of double-sided adhesive tape. Optionally, an interior trim 402 can be installed around the perimeter of the last glazing layer 30 for ornamentation.

Figure 19:
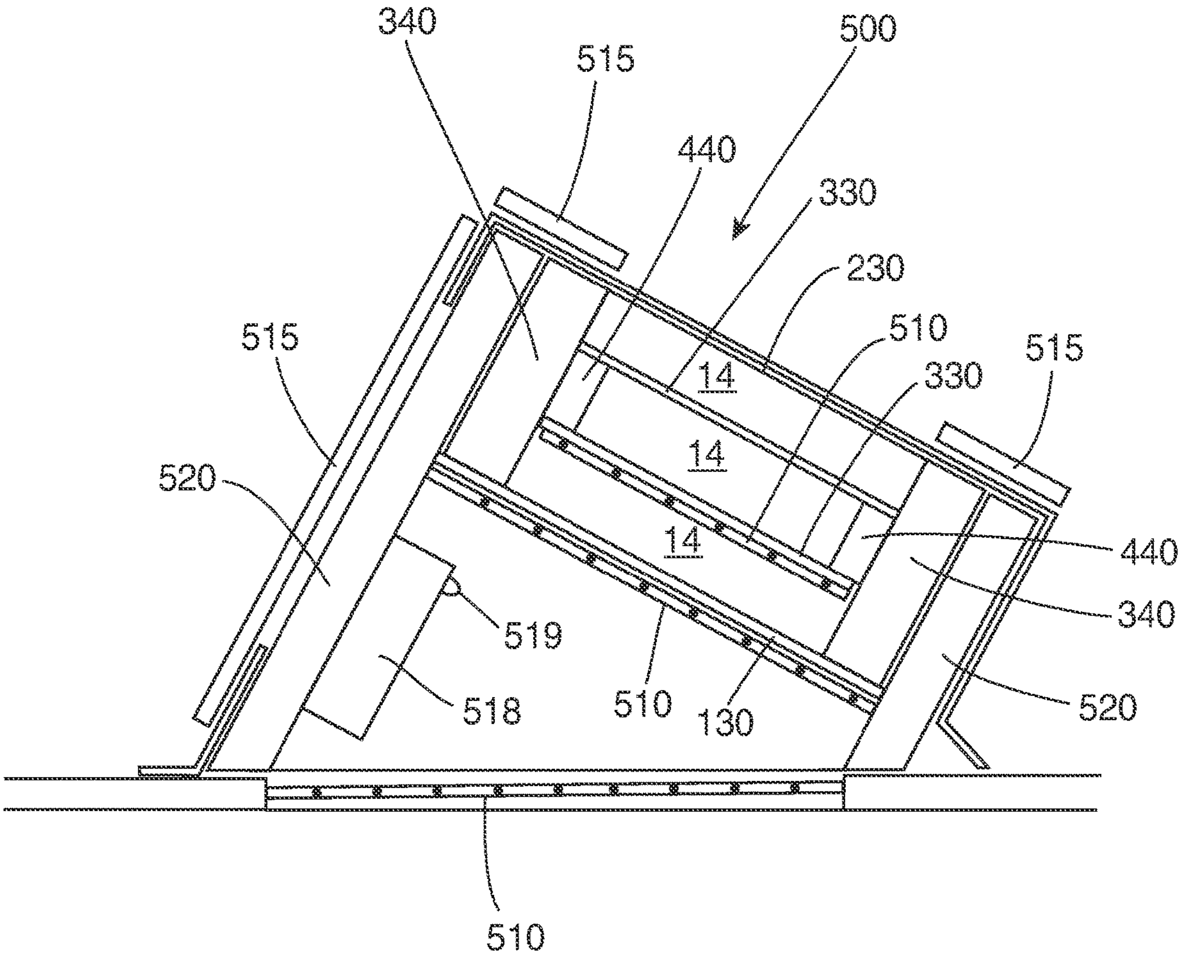
FIG. 19 is a cut-away view of a window or sunlight assembly as disclosed in accordance with at least one embodiment of the present invention.

With reference now to FIG. 19, a further embodiment of the present invention may include a window assembly, or as shown, a skylight assembly 500 with one or more integrated light assemblies or light structures 510. Specifically, window or skylight assembly 500 may include one or more light emitting diode (LED) structures or arrays 510 structured to emit light into the building interior. For example, the LED structures 510 may be secured to one or more of the glazing layers 30 and/or any framing or enclosure sections, such as the sash assembly 340, spacer assembly 440 or portions of the skylight structural enclosure elements 520. In some cases, the LED structures may be secured around the perimeter or near the outer edges of one or more of the glazing layers 30 and/or inside the perimeter of the skylight enclosure 520.

Furthermore, and still referring to FIG. 19, one or more solar or photovoltaic panels 515 can be mounted to the exterior of the skylight enclosure 520 and/or portions of the window or skylight assembly 500. The solar or photovoltaic panel(s) 515 can be used to charge or supply power to one or more batteries generally referenced as 518, with a voltage regulation circuit as needed. The one or more batteries 18 are used to supply power to the one or more LED structures 510. In some embodiments, one or more photocell (or other) light sensors 519 may be included to control the LED structures. In other words, depending on the results of the sensors and the particular sunlight at the time, the light sensor(s) 519 and/or another control assembly can automatically control the light output, by either turning the LEDs on or off, dimming or brightening the LEDs, changing the LED color or hue output, etc. In one example, the skylight assembly 500 can be used to autonomously (vie the sensor(s), LED structure(s) and/or control assembly) provide daylight by day (e.g., by turning off the LED structures during the day) and electric light by night (e.g., by tuning on the LED structures).

Figure 20A:
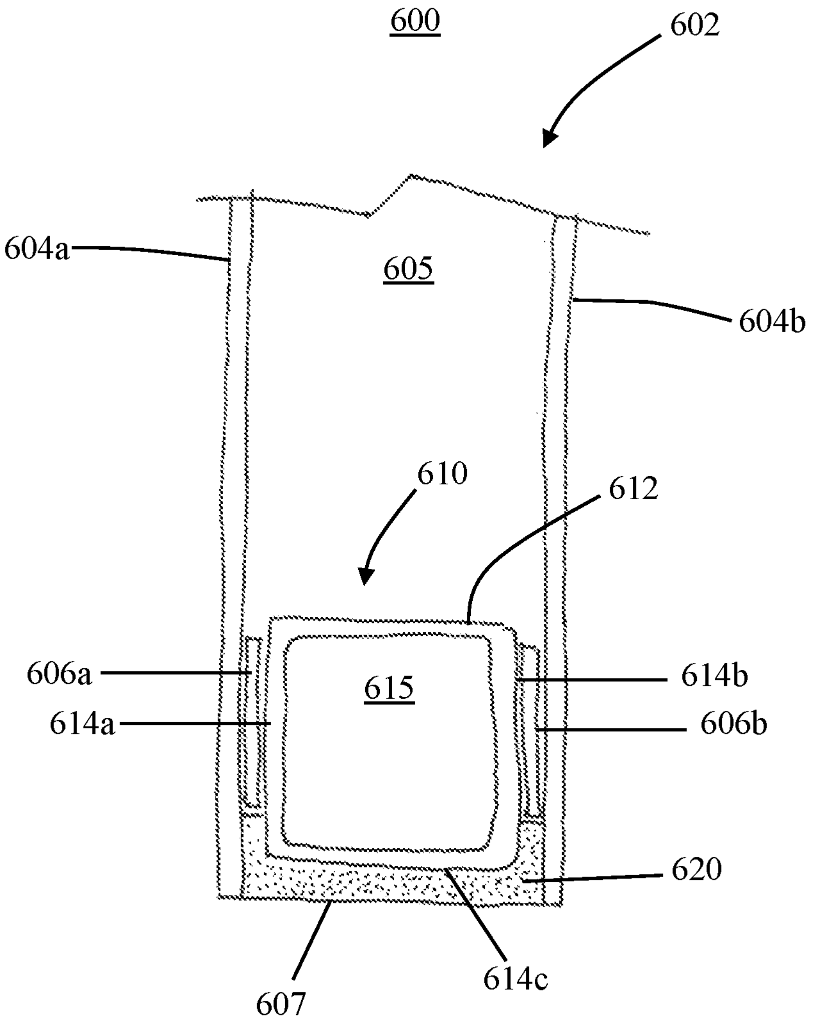
FIG. 20A is a sectional cut-away view of yet another embodiment of the multi-glazed window assembly as disclosed in accordance with at least one embodiment showing two glazing layers, one spacer assembly and one insulating airspace.
Figure 20B:
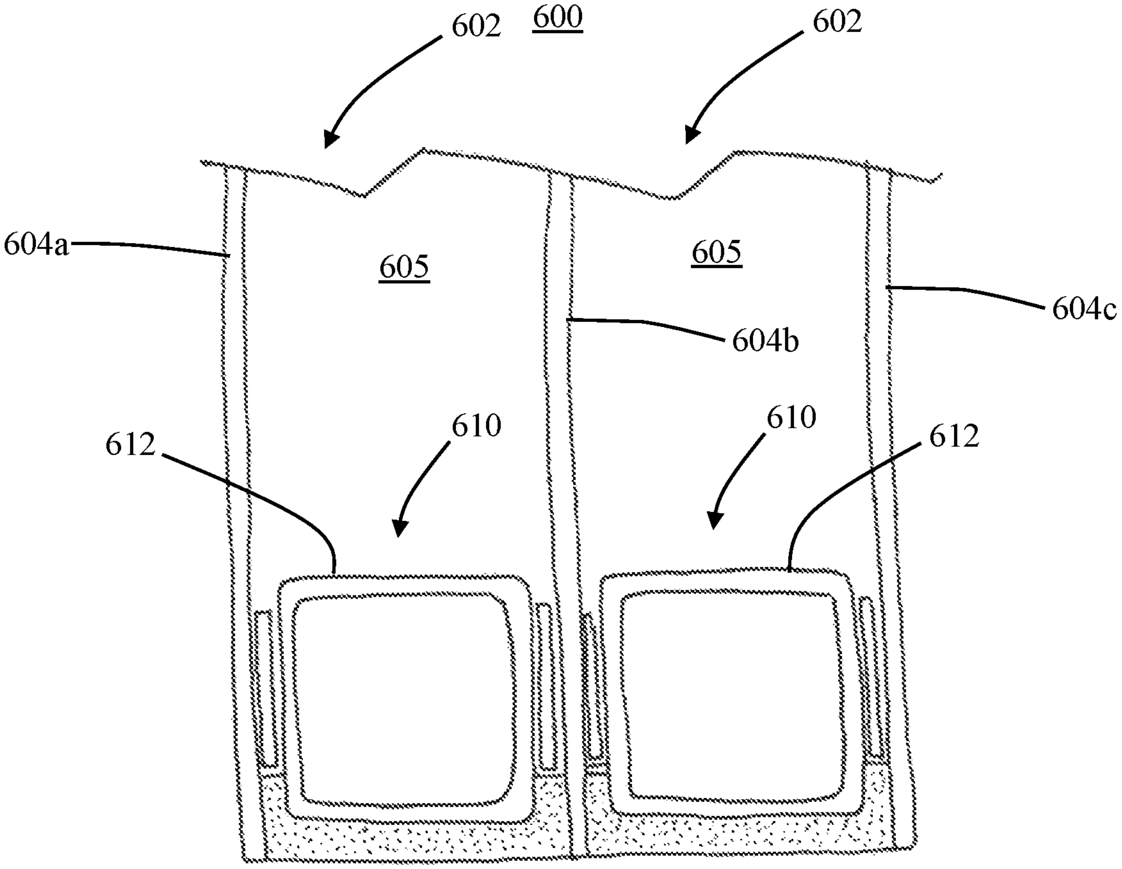
FIG. 20B is a sectional cut-away view of another embodiment of the multi-glazed window assembly as disclosed in accordance with at least one embodiment showing three glazing layers, two spacer assemblies and two insulating airspaces.
Figure 20C:
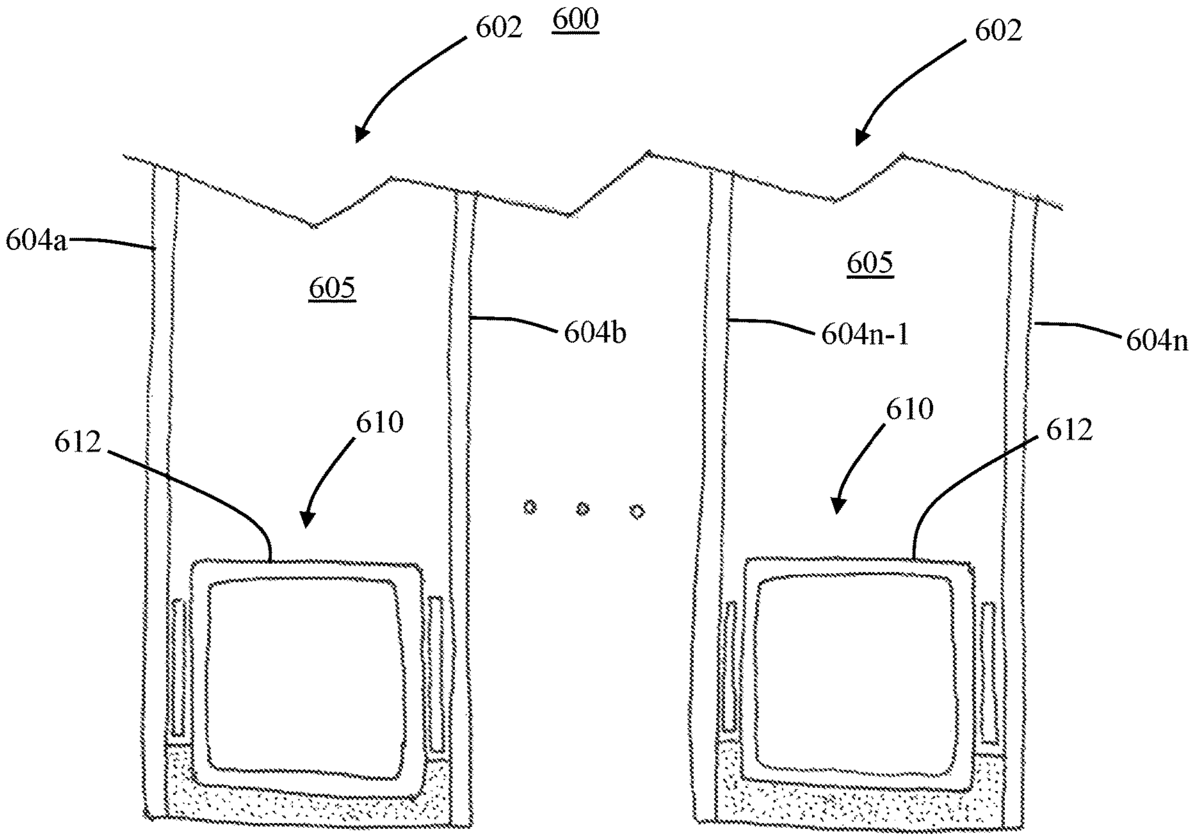
FIG. 20C is a sectional cut-away and exploded view of another embodiment of the multi-glazed window assembly as disclosed in accordance with at least one embodiment.

With reference now to FIGS. 20A-20C, yet another embodiment of the multi-glazed window assembly 600 of the present invention is shown. In particular, as shown in FIG. 20A, the multi-glazed window assembly 600 includes one unit 602, which has at least two spaced apart glazing layers 604*a*, 604*b*, and at least one spacer assembly 610 disposed between the glazing layers 604*a*, 604*b* while collectively defining an insulating airspace, referenced as 605. In some embodiments, one or all of the insulating airspaces 605 may include a width (e.g., measured between the inside surfaces of adjacent glazing layers 604*a*, 694*b*) of approximately ¾ inches, although other sizes are contemplated within the full spirit and scope of the present invention. Furthermore, each glazing layer 604*a*, 604*b* may be 0.08 inch acrylic panels, although other sizes and other materials are contemplated and included within the present invention.

FIG. 20B illustrates a multi-glazed window assembly 600 with a plurality of (e.g., two) adjacent or side-by-side units 602. In this embodiment, the two units 602 may share a common, intermediately disposed glazing layer, which is shown as glazing layer 604*b*. More specifically, three glazing layers 604*a-c* are spaced from one another in a generally parallel (but not necessarily) manner to form two insulating airspaces 605; one or a first insulating airspace 605 disposed or defined between glazing layers 604*a* and 604*b*, and another or a second insulating airspace 605 disposed or defined between glazing layers 604*b* and 604*c*.

FIG. 20C is provided to illustrate that several more units 602 can be assembled together in the same or similar manner as that shown in FIG. 20B to define a multi-glazed window assembly 600 that defines two or more insulating airspaces 605. In particular, the multi-glazed window assembly 600 of the present invention may define one through nine, or more, insulating airspaces 605. Each insulating airspace 605 may include a spacer assembly 610 disposed between adjacent glazing layers 604*a-n* as provided herein. As shown, glazing layers 604*a-n* can be used to define the insulating airspaces 605. Adjacent units 602 can share a common glazing layer (e.g., as provided in FIG. 20B), although it is contemplated that in some cases each unit 602 may include distinct pairs of glazing layers such that adjacent units may not share a common glazing layer, but may instead have abutting, adjacent glazing layers.

It should also be noted that, in at least one embodiment of the present invention constructed in accordance with the embodiments illustrated in FIGS. 20A-C may exhibit an R-value of approximately 4.5 with three insulating airspaces (three spacer assemblies 610 and four glazing layers), an R-value of approximately 6.8 with five insulating airspaces (five spacer assemblies 610 and six glazing layers), and an R-value of approximately 9.4 with seven insulating airspaces (seven spacer assemblies 610 and eight glazing layers).

In any event, the spacer assembly 610 of at least one embodiment includes a clear (e.g., transparent) or partially clear (e.g., translucent) tube 612. The tube 612 may, in some embodiments, include a square or rectangular cross-section with sharp or rounded corners, however, other shapes, including other polygonal shapes, circular or oval shapes, etc. are contemplated. Furthermore, the tube 612 or spacer assembly 610 of at least one embodiment may be constructed out of acrylic or other like materials. As just an example, the tube 612 may be $a^3$ inch thick acrylic square tube, although other materials, shapes and sizes are contemplated within the full spirit and scope of the present invention.

In addition, the tube 612 or spacer assembly 610 of at least one embodiment may function as the sash or frame of the window assembly. In other words, the assembly 600 of at least one embodiment may eliminate the need for or otherwise replace the sash and frame typically found on many traditional or common window units.

In some embodiments, the tube 612 of the spacer assembly 610 defines opposing lateral sides, referenced as 614*a*, 614*b* which are attached to the respective glazing layer 604*a*, 604*b*. In some cases, as described in accordance with other embodiments presented herein, the spacer assembly 600 or tube 612 thereof may be attached to the glazing layers 604*a*, 604*b* via peel-and-stick, double-sided adhesive tape, referenced as 606*a*, 606*b*, although other manners of adhering, connecting or attaching the tube(s) 612 to the corresponding glazing layer(s), e.g., 604*a*, 604*b*, 604*n*, is contemplated. It should be noted that in the illustrations provided at least in FIGS. 20A 20C, the double-sided adhesive tape 606*a*, 606*b* is shown separated from the surfaces of the corresponding glazing layer 604*a*, 604*b* and the tube 612, however, that is for illustrative purposes only and it should be apparent that, in operation, the tape 606*a-b* adhesively contacts the facing surfaces of the glazing layer and tube. The thickness and size of the tape 606*a-b* shown in the drawings is also provided for illustrative purposes and may not be to scale.

Furthermore, still referring to FIGS. 20A-C, in at least one embodiment, a sealant 620 may be placed along a longitudinal edge 614*c* of the tube 612, such as, between a perimeter edge 607 and the tube 612. In some cases, the sealant 620 may span the entire longitudinal edge or surface 614 while also extending at least partially along the opposing lateral edges or surfaces 614*a*, 614*b* of the tube 612 and between the tube 612 and the corresponding glazing layer(s) 604*a*, 604*b*. This sealant 620 can assist with the secure attachment of the spacer assembly 610 to the perimeter edge 607 and the glazing layers 60*a*, 604*b*. It should also be noted that the sealant 620 may be thinner than shown in the Figures in that the sealant 620 shown is for illustrative purposes and may not be to scale. For example, in one embodiment, the spacer assembly 610 and in particular the tube 612 thereof may be disposed at or approximately at ⅛ inches in from the glazing layer(s) 604*a*, 604*b*, and in some cases, ⅛ inches up (or in) from the perimeter edge 607. It should also be noted that the distance (e.g., ⅛ inches) between the tube 612 and the glazing layer 604*a*, 604*b* may be measured from the inside surface of the glazing layer, the outside surface of the glazing layer, or the center of the glazing layer.

It should also be noted that in some embodiments, double-sided adhesive tape can also be used between the tube 612 and the perimeter edge 607 in addition to or instead of the sealant 620.

Figure 21:
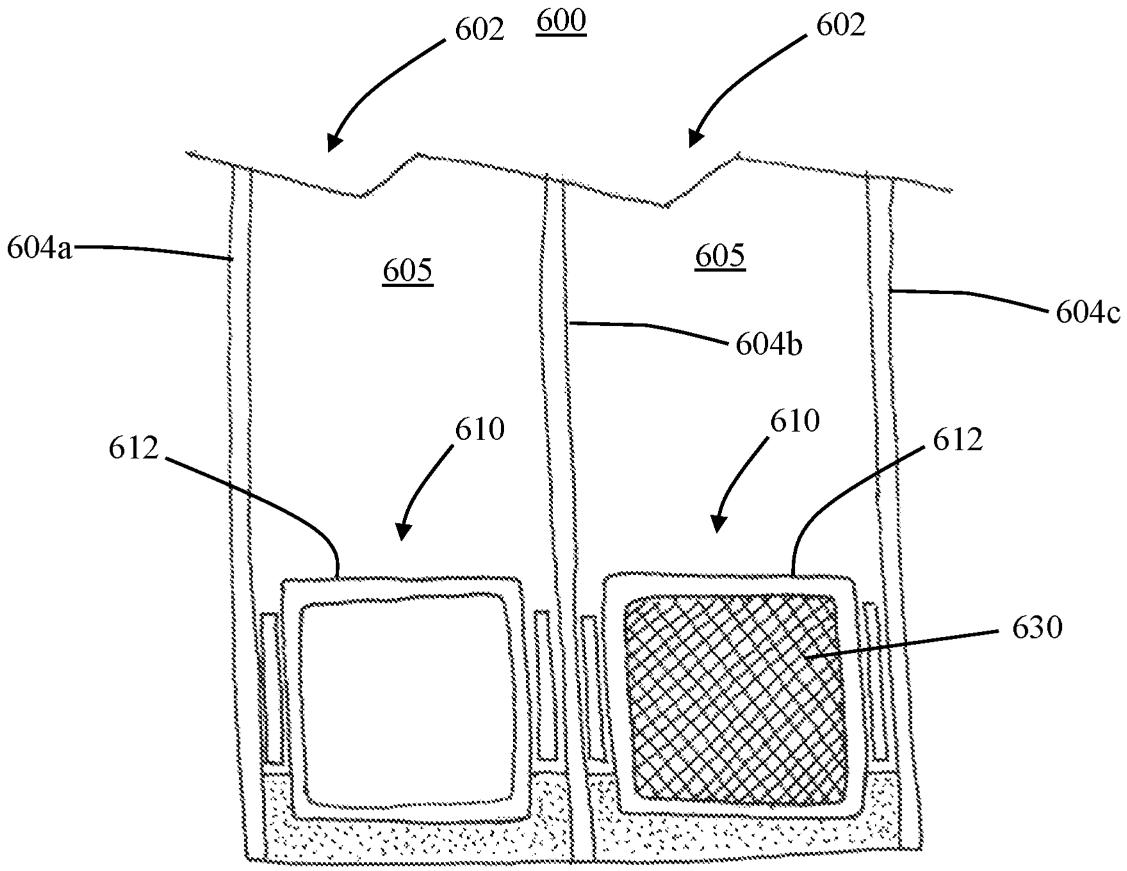
FIG. 21 is a sectional cut-away view of another embodiment of the multi-glazed window assembly as disclosed in accordance with at least one embodiment showing a thermal storage medium filling material disposed within at least one of the spacer assemblies.

Furthermore, in at least one embodiment, the tube 612 of the spacer assembly 610 may define an open interior space, generally referenced as 615. In other words, the clear acrylic (or other) tube 612 of the spacer assembly 610 may include an interior area that is generally open or available to be filled with another material. With reference now to FIG. 21, the cross-hatched shading provided on the interior of at least one of the tubes 612 represents a filling material 630 disposed therein. This filling material 630 may be present in one of the tube(s) 612, all of the tube(s) 612 or in any number of less than or equal to all of the tube(s) 612.

More in particular, the filling material 630 shown in FIG. 21 may include a phase-change material or medium that can provide integral heat or thermal storage designed to reduce the overall energy costs associated with heating or cooling the corresponding building or room within which the window assembly 600 is installed. As an example, the filling material 630, such as the phase-change material, may melt between 67 degrees and 74 degrees Fahrenheit with heat enthalpy of 60,000 BTU/cf.×0.048 cf in a 2278 window with one perimeter loop of PCM, which is 2880 BTU of latent heat storage/loop. Of course, this is merely exemplary and other materials with other heat storage and the like properties are contemplated as filling materials 630.

Figure 22A:
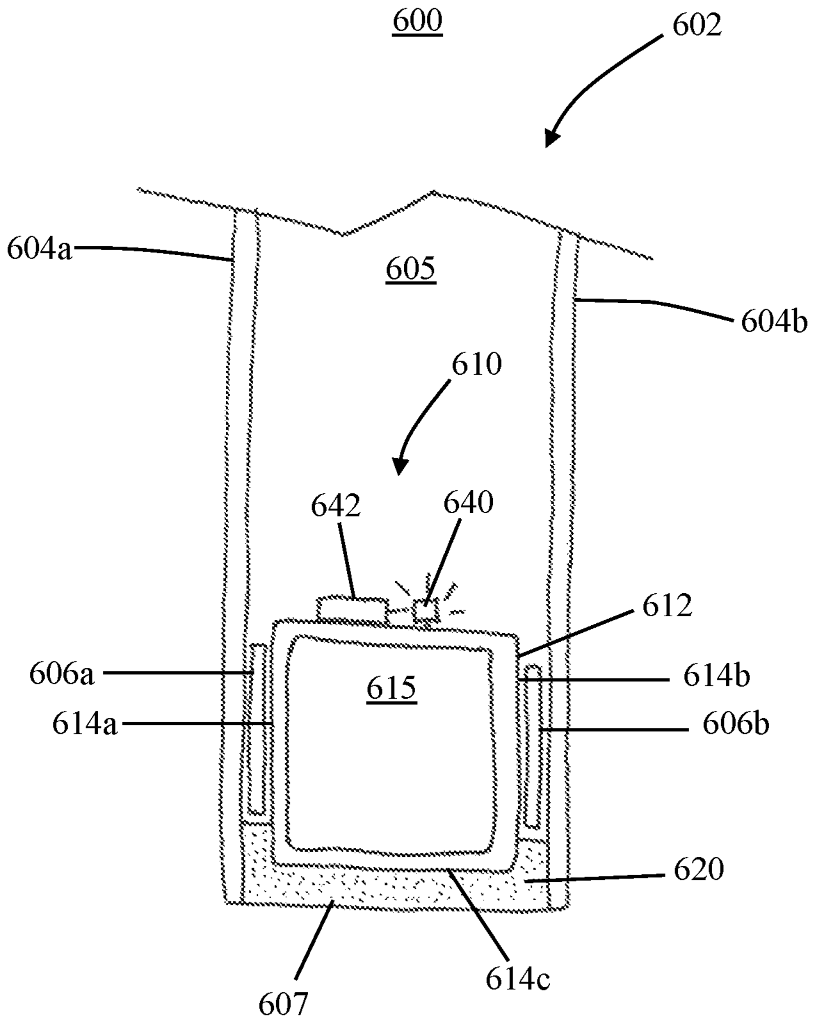
FIG. 22A is a sectional cut-away view of another embodiment of the multi-glazed window assembly as disclosed in accordance with at least one embodiment showing a lighting assembly disposed within the insulating airspace.
Figure 22B:
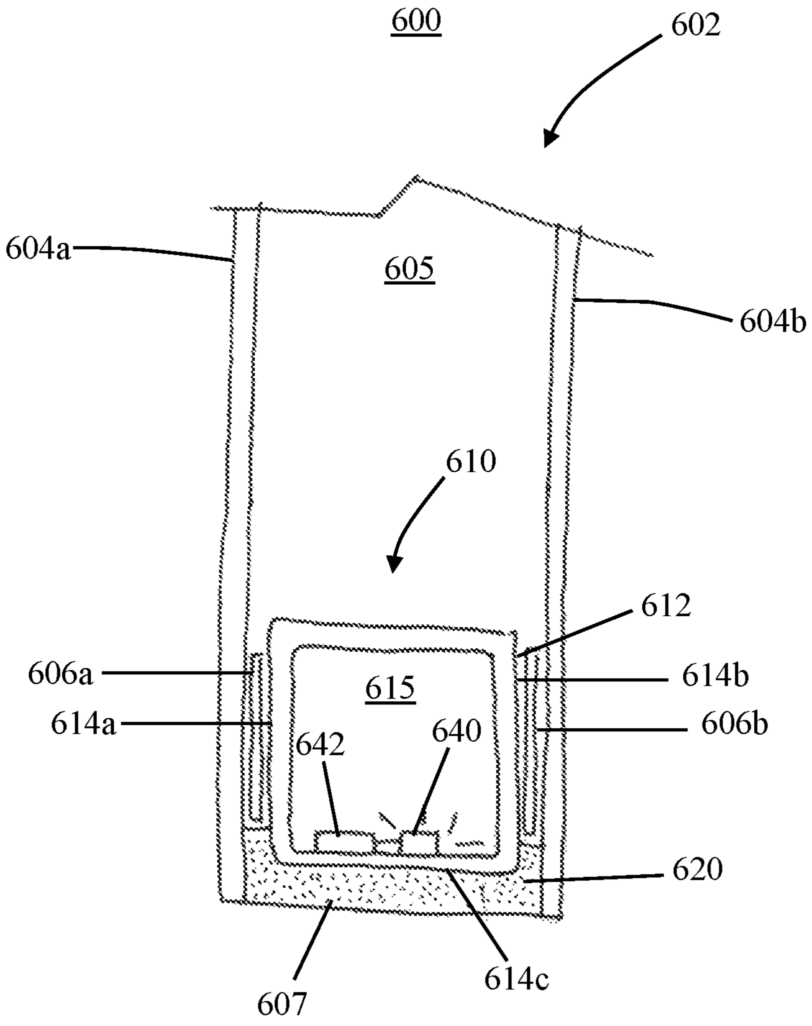
FIG. 22B is a sectional cut-away view of another embodiment of the multi-glazed window assembly as disclosed in accordance with at least one embodiment showing a lighting assembly disposed within the insulating airspace and within the clear tube of the spacer assembly.

Furthermore, with reference to FIGS. 22A and 22B, in at least one embodiment of the present invention, one or more light assemblies or light sources 640 may be disposed within one or more of the insulating airspaces 605, and in some cases, within the one or more spacers or tubes 612. Moreover, the at least one light assembly or light source 640 may be in the form of or otherwise include a light emitting diode (LED) however other light sources are contemplated within the scope of the present invention including compact fluorescent lamps (CFLs), halogen lights, light strips, etc.

In any event, as shown in FIGS. 22A-22B, the light source 640 may be electrically attached to a power source 642, such as one or more batteries, although other power sources are contemplated. In particular, the one or more batteries may be replaceable or rechargeable. In some cases, the one or more batteries 642 may be rechargeable wirelessly through the glazing layer(s) such that physical access thereto may not be needed. In other embodiments, a cable (not shown) may be passed from the light source 640 to a location external to the assembly 600 (e.g., through a corresponding hole or channel), which can then be plugged in or electrically connected to a power source.

The light source 640, when illuminated, can provide edge-to-edge lighting to the window assembly 600, for example, by lighting the edges of, between the edges of, and/or to the edges of the glazing layer(s) 604*a-n* and/or the clear tube(s) 612. This is particularly true with acrylic glazing layers although glass and other materials can also produce edge lighting.

Furthermore, in at least one embodiment, a light-transmitting thermal storage medium may be disposed between at least two of the glazing layer(s) 604*a-n* and/or within the one or more spacers or clear tubes 612. For instance, an example of a light-transmitting thermal storage medium may be water, although other mediums, whether liquid, solid or otherwise, are contemplated.

It should also be noted that, as described in accordance with other embodiments provided herein, the glazing layers 604*a-n* of at least one embodiment transfer structural roof loads of the building within which the assembly 600 is installed. In some cases, the window assembly 600 can be installed without a window header. Furthermore, multiple glazing layers 604*a-n* can act as structural diaphragms of a stress-skin panel, as disclosed in accordance with other embodiments provided herein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described.

What is claimed is:

1. A multi-glazed window assembly for installation within a window opening of a building, said multi-glazed window assembly comprising:

a perimeter sash assembly comprising a bottom perimeter sash, a top perimeter sash, a left side perimeter sash and a right side perimeter sash, each of said bottom perimeter sash, said top perimeter sash, said left side perimeter sash and said right side perimeter sash comprising an enclosed surface spanning between a first face and a second face, said first face being opposite said second face, wherein each of said bottom perimeter sash, said top perimeter sash, said left side perimeter sash and said right side perimeter sash comprise a width measured from said first face to said second face, wherein said perimeter sash assembly comprises a width equal to said width of any one of said top perimeter sash, said left side perimeter sash and said right side perimeter sash, at least one spacer assembly comprising a bottom spacer, a top spacer, a left side spacer and a right side spacer, each of said bottom spacer, said top spacer, said left side spacer and said right side spacer comprising a first face and a second face, said first face being opposite said second face, wherein each of said bottom spacer, said top spacer, said left side spacer and said right side spacer comprise a width measured from said first face to said second face, wherein said spacer assembly comprises a width equal to said width of any one of said bottom spacer, said top spacer, said left side spacer and said right side spacer, said width of said spacer assembly is less than said width of said perimeter sash assembly, said spacer assembly being fixed to said enclosed surface of said bottom perimeter sash, said top perimeter sash, said left side perimeter sash and said right side perimeter sash, an inner glazing layer attached to said first faces of said perimeter sash assembly, a first intermediate glazing layer attached to said first faces of said spacer assembly, a second intermediate glazing layer attached to said second faces of said spacer assembly, an outer glazing layer attached to said second faces of said perimeter sash assembly, at least one first stop attached to the building proximate the window opening, at least one second stop attached to an outside surface of the building proximate the window opening, wherein said at least one second stop comprises an overhang portion that extends over a portion of the window opening, wherein said overhang portion of said at least one second stop is laterally aligned with said at least one first stop to define a space there between, and wherein at least a portion of said top perimeter sash is removably disposed within said space defined between said at least one first stop and said overhang portion of said at least one second stop, wherein compression weather stripping is disposed between said at least one first stop and a top portion of said inner glazing layer, wherein compression weather stripping is disposed between said at least one second stop and a top portion of said outer glazing layer, wherein said first intermediate glazing layer and said second intermediate glazing layer are attached to said spacer assembly via double-sided adhesive tape.

2. The multi-glazed window assembly as recited in claim 1 wherein said inner glazing layer and said outer glazing layer are attached to said perimeter sash assembly via double-sided adhesive tape.

3. The multi-glazed window assembly as recited in claim 2 further comprising sealing tape attached to an inside perimeter portion of said inner glazing layer and at least a portion of an exterior surface of said perimeter sash assembly.

4. The multi-glazed window assembly as recited in claim 3 wherein said sealing tape is further attached to an outside perimeter portion of said outer glazing layer.

5. The multi-glazed window assembly as recited in claim 1 wherein said spacer assembly, said perimeter sash assembly, said inner glazing layer, said first intermediate glazing layer, said second intermediate glazing layer and said outer glazing layer transfer structural roof loads of the building, within which said multi-glazed window assembly is installed, and wherein said multi-glazed window assembly is installed within the building without a window header.

* * * * *